United States Patent
Shekhar et al.

(10) Patent No.: US 11,558,466 B1
(45) Date of Patent: Jan. 17, 2023

(54) PACKET FORWARDING CONTROL PROTOCOL (PFCP) MESSAGE SERVICE USING A REMOTE PROCEDURE CALL (RPC) BASED PROTOCOL SUITABLE FOR PFCP CONNECTION SHARING

(71) Applicant: Cisco Technology, Inc., San Jose, CA (US)

(72) Inventors: Ravi Shekhar, Maharashtra (IN); Ameo Ghosh, Maharashtra (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/379,468

(22) Filed: Jul. 19, 2021

(51) Int. Cl.
*G06F 15/16* (2006.01)
*H04L 67/14* (2022.01)
*H04L 67/02* (2022.01)
*H04L 67/133* (2022.01)

(52) U.S. Cl.
CPC .............. *H04L 67/14* (2013.01); *H04L 67/02* (2013.01); *H04L 67/133* (2022.05)

(58) Field of Classification Search
CPC .......... H04L 67/14; H04L 67/02; H04L 67/40
USPC ........................................ 709/206, 227, 230
See application file for complete search history.

(56) References Cited

U.S. PATENT DOCUMENTS

| | | | | |
|---|---|---|---|---|
| 5,926,636 | A | * | 7/1999 | Lam ........................ G06F 9/547 719/330 |
| 7,853,962 | B1 | | 12/2010 | Romano et al. |

| | | | |
|---|---|---|---|
| 2019/0045037 | A1 | 2/2019 | Sukhomlinov et al. |
| 2019/0245732 | A1 | 8/2019 | Luo et al. |
| 2020/0007632 | A1 | 1/2020 | Landais et al. |
| 2020/0107213 | A1 * | 4/2020 | Park ........................ H04L 43/12 |

(Continued)

FOREIGN PATENT DOCUMENTS

| | | | | |
|---|---|---|---|---|
| CN | 111835802 | A * | 10/2020 | ......... H04L 67/1097 |
| WO | 2020148062 | A1 | 7/2020 | |

(Continued)

OTHER PUBLICATIONS

Cisco, "Cisco IOS XE gRPC Model-Driven Telemetry", White paper,Cisco Public, C11-743401-00, Mar. 2020, 8 pages.

(Continued)

*Primary Examiner* — Liang Che A Wang
(74) *Attorney, Agent, or Firm* — Edell, Shapiro & Finnan, LLC

(57) ABSTRACT

A computing device may be configured to provide a shared N4 termination function for a plurality of Session Management Function (SMF) instances of an SMF Set and interface with one or more User Plane Function (UPF) instances. To achieve this, the computing device may operate a server configured with a Remote Procedure Call (RPC)-based protocol (e.g. gRPC Remote Procedure Call or "gRPC") for a Packet Forwarding Control Protocol (PFCP) message service for serving a plurality of client stubs respectively situated at the plurality of SMF instances. The server may perform processing associated with each client stub by receiving an RPC-based protocol message which indicates a request, unpacking the RPC-based protocol message for obtaining PFCP message request data, and operating or interfacing with a PFCP message handling client for sending a PFCP message having the PFCP message request data to an indicated one of the UPF instances.

20 Claims, 15 Drawing Sheets

(56) References Cited

U.S. PATENT DOCUMENTS

| | | | |
|---|---|---|---|
| 2020/0257579 A1 | 8/2020 | Shekhar et al. | |
| 2020/0313983 A1 | 10/2020 | Stammers et al. | |
| 2021/0068172 A1* | 3/2021 | Jeong | H04W 76/10 |
| 2021/0112409 A1 | 4/2021 | Rune et al. | |
| 2021/0117360 A1* | 4/2021 | Kutch | G06F 9/5083 |
| 2022/0086218 A1 | 3/2022 | Sabella et al. | |

FOREIGN PATENT DOCUMENTS

| | | |
|---|---|---|
| WO | 2020221465 A1 | 11/2020 |
| WO | 2020229409 A1 | 11/2020 |

OTHER PUBLICATIONS

Tulja Vamshi Kiran Buyakar, "Operational Aspects of Network Slicing in LTE and 5G Architectures", Indian Institute of Technology Hyderabad, Jun. 2019, 50 pages.

Ryan Hamilton, et al., "QUIC: A UDP-Based Secure and Reliable Transport for HTTP/2 draft-tsvwg-quic-protocol-02", Network Working Group, Internet-Draft, Intended status: Informational, Jan. 13, 2016, 37 pages.

Michael Cho, et al., "Introduction to Using gRPC-based Protocol for Model-Driven Management of IOS-XR", Cisco, imagine Intuitive, DEVWKS-1381, Jan. 28-Feb. 1, 2019, 38 pages.

Sanjeev Panem Jaya, et al., "Converging Sessions or Data Paths on a User Plane", Technical Disclosure Commons, https://www.tdcommons.org/dpubs_series/3654, Oct. 5, 2020, 14 pages.

Christian Maciocco, et al., "5G Cloud Native from RAN to Core", ONF Spotlight, 5G Transformation with Open Source, Sep. 5, 2020, 38 pages.

Cisco, "Use gRPC Protocol to Define Network Operations with Data Models", Jan. 28, 2020, 14 pages.

Cisco, "gRPC Agent", Apr. 8, 2021, 12 pages.

Andrew D. Birrell, et al.,"Implementing Remote Procedure Calls", ACM Transactions on Computer Systems, vol. 2, No. 1, Feb. 1984, 21 pages.

Pramono Winata, "What is gRPC? Protocol Buffers, Streaming, and Architecture Explained", FreeCodeCamp, https://www.freecodecamp.org/news/what-is-grpc-protocol-buffers-stream-architecture/ Nov. 9, 2020, 16 pages.

"3rd Generation Partnership Project; Technical Specification Group Services and System Aspects; System architecture for the 5G System (5GS); Stage 2 (Release 16)," 3GPP TS 23.501 V16.5.0, Jul. 2020, 441 pages.

"3rd Generation Partnership Project; Technical Specification Group Core Network and Terminals; Interface between the Control Plane and the User Plane Nodes; Stage 3 (Release 16)," 3GPP TS 29.244 V16.4.0, Jun. 2020, 310 pages.

S. Matsushima, et al., "Protocol for Forwarding Policy Configuration (FPC) in DMM—draft-ietf-dmm-fpc-cpdp-14," DMM Working Group, Internet-Draft, Intended status: Standards Track, Sep. 23, 2020, 34 pages.

\* cited by examiner

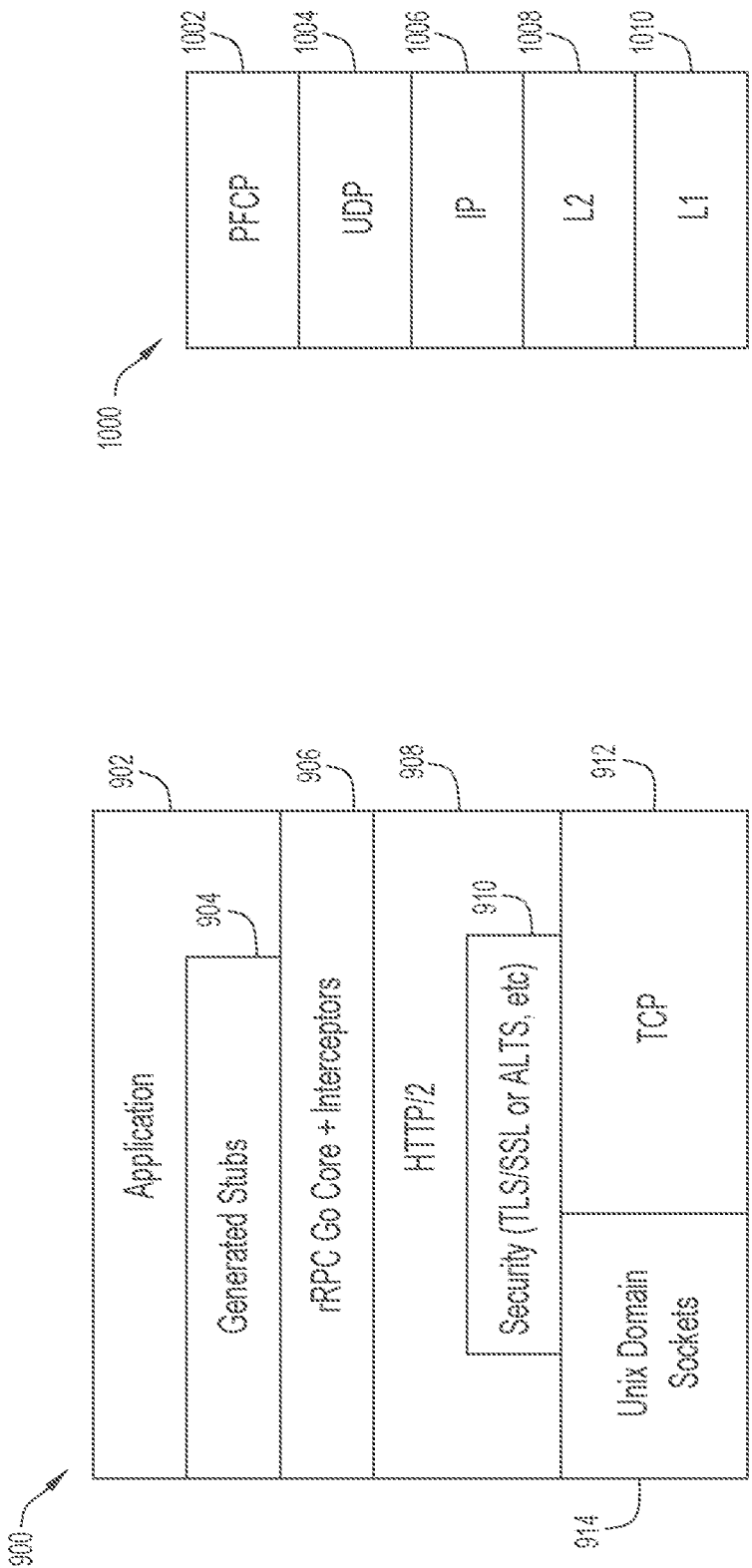

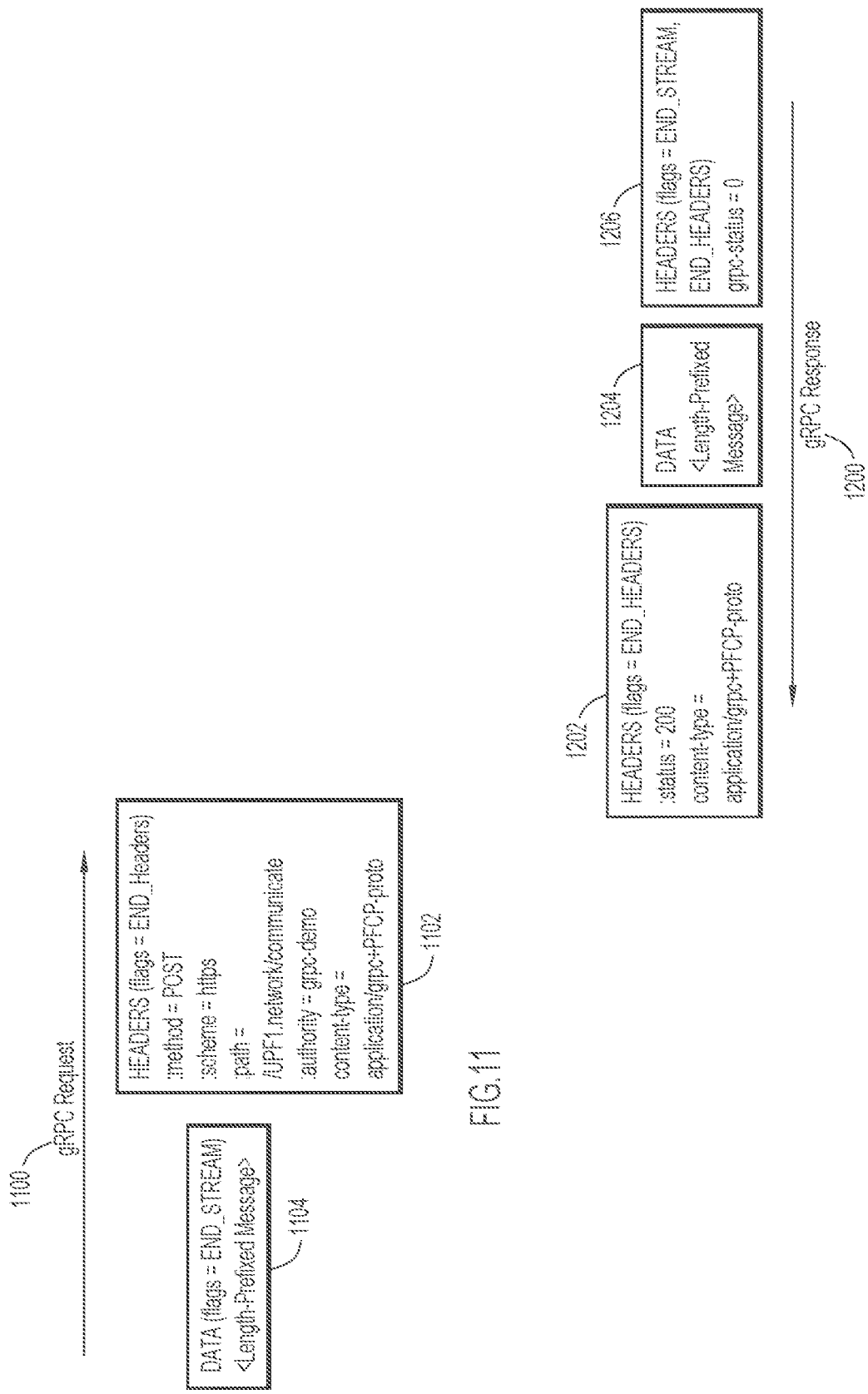

US 11,558,466 B1

PACKET FORWARDING CONTROL PROTOCOL (PFCP) MESSAGE SERVICE USING A REMOTE PROCEDURE CALL (RPC) BASED PROTOCOL SUITABLE FOR PFCP CONNECTION SHARING

TECHNICAL FIELD

The present disclosure relates to telecommunication systems, and in particular, to techniques and mechanisms for providing a Packet Forwarding Control Protocol (PFCP) message service using a Remote Procedure Call (RPC)-based protocol, which is suitable to facilitate PFCP connection sharing by Session Management Function (SMF) instances of an SMF Set, for minimizing connections between the SMF and User Plane Functions (UPFs) in a mobile network.

BACKGROUND

The Fifth Generation (5G) Core (5GC) architecture for a 5G network is based on the Third Generation Partnership Project (3GPP) Technical Specification (TS) 23.501. According to the 5GC architecture, a Session Management Function (SMF) may maintain a Packet Forward Control Protocol (PFCP) session with a User Plane Function (UPF) over an N4 interface. This N4 connection may be established for every Protocol Data Unit (PDU) session created by a user equipment (UE) so that the SMF may control the session.

Recently, 3GPP Release 16 (e.g. 3GPP TS 23.501, 29.244) introduced the concept of a Network Function (NF) Set, where all NF instances within the NF Set are able to share the same user context data of a UE. For example, an SMF instance may be part of an SMF Set of multiple SMF instances that share the same user context data of a UE. Given multiple SMF instances within an SMF Set, and the potential use of multiple UPF instances in actual deployment, the number of N4 connections between SMFs and UPFs multiply such that connection management at the SMF becomes overcomplicated.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 9 is a diagram of an example of a protocol stack of gRPC which may be utilized for the PFCP message service according to some implementations;

FIG. 10 is a diagram of a protocol stack for a control plane over an N4 connection or reference point that utilizes the PFCP;

FIG. 11 is an illustrative example of a message which indicates a gRPC request according to gRPC;

FIG. 12 is an illustrative example of a message which indicates a gRPC response according to gRPC;

DESCRIPTION OF EXAMPLE EMBODIMENTS

Figure 1A:
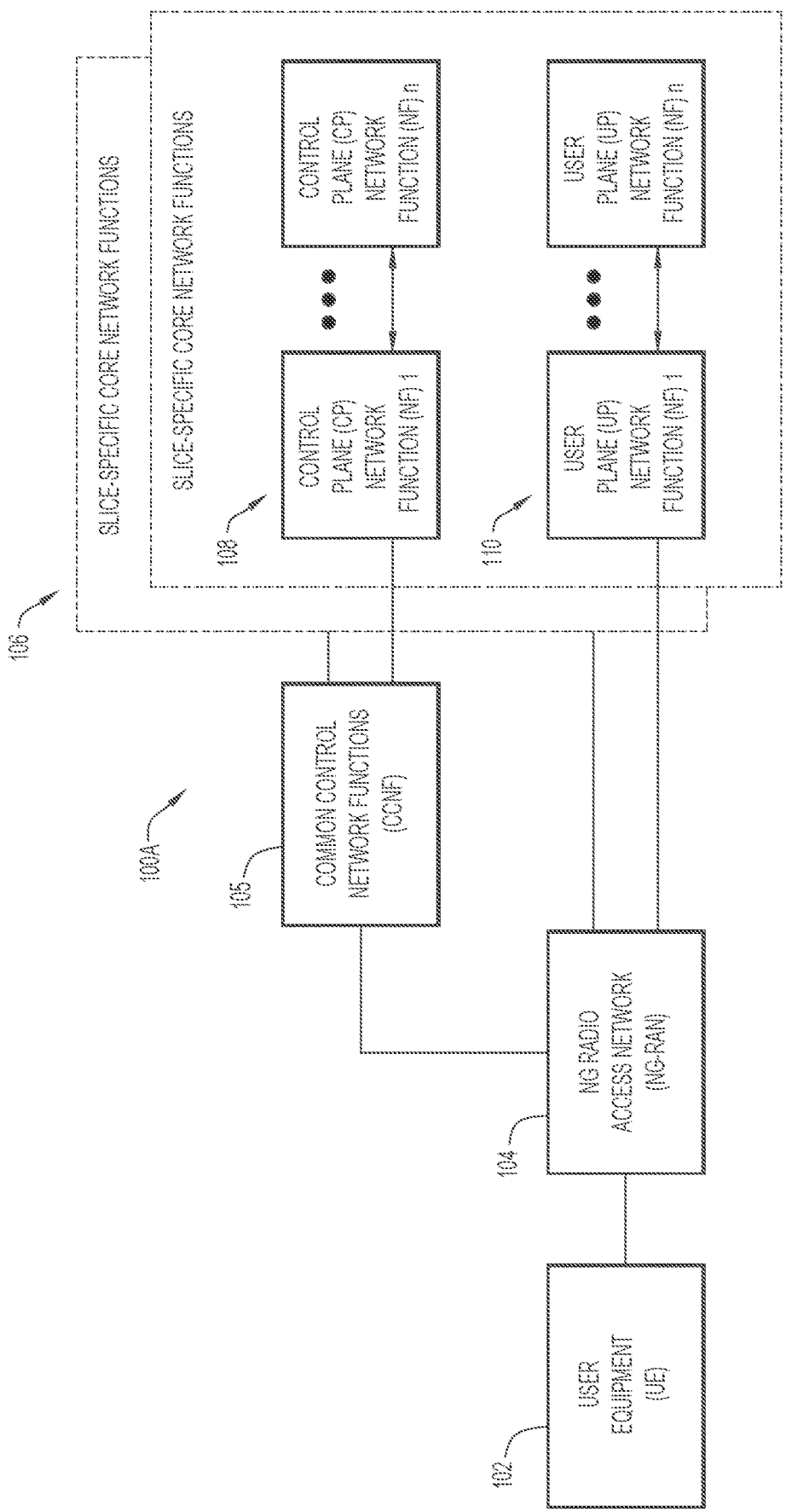
FIG. 1A is an illustrative representation of a basic network architecture of a Fifth Generation (5G) network.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview Techniques and mechanisms for providing a Packet Forwarding Control Protocol (PFCP) message service using a Remote Procedure Call (RPC)-based protocol are described herein. The PFCP message service using the RPC-based protocol is suitable to facilitate PFCP connection sharing by Session Management Function (SMF) instances of an SMF Set for minimizing connections between the SMF and User Plane Functions (UPFs).

In one illustrative example, a computing device may be configured to serve as a common or shared N4 termination function for a plurality of SMF instances of an SMF Set and interface with one or more UPF instances. To achieve this, the computing device may operate a server configured with a high-performance RPC-based protocol for a PFCP message service, for serving a plurality of RPC-based protocol client stubs respectively situated at the plurality of SMF instances. The computing device may perform processing associated with each client stub by receiving an RPC-based protocol message which indicates a request, unpacking the RPC-based protocol message for obtaining PFCP message request data, and operating or interfacing with a PFCP message handling client for sending a PFCP message having the PFCP message request data to an indicated one of the UPF instances. The computing device may continue to perform processing associated with each client stub by operating or interfacing with the PFCP message handling client for receiving from the UPF instance a PFCP message which indicates a PFCP response having PFCP message response data; packing the PFCP message response data into an RPC-based protocol message which indicates a response; and sending to the SMF instance the RPC-based protocol message which indicates the response.

In some implementations, the RPC-based protocol utilizes an underlying transport protocol which is or is based on Hypertext Transfer Protocol (HTTP) 2.0 or greater. In some preferred implementations, the RPC-based protocol may be or include gRPC Remote Procedure Call (gRPC) or a gRPC protocol. In some implementations, the RPC-based protocol utilizes a Quick User Datagram Protocol (UDP) Internet Connections (QUIC) or a QUIC protocol.

More detailed and alternative techniques and implementations are provided herein as described below.

EXAMPLE EMBODIMENTS

FIG. 1A is an illustrative representation of a general network architecture 100A of a Fifth Generation (5G) network. Network architecture 100A includes common control network functions (CCNF) 105 and a plurality of slice-specific core network functions 106. With network architecture 100A, the 5G network may be configured to facilitate communications for a UE 102. UE 102 may obtain access to the 5G network via a radio access network (RAN) or a Next Generation (NG) RAN (NG-RAN) 104. NG-RAN 104 may include one or more base stations or gNodeBs (gNBs), such as a gNB 107. UE 102 may be any suitable type of device, such as a cellular telephone, a smart phone, a tablet device, an Internet of Things (IoT) device, a Machine-to-Machine (M2M) device, and a sensor, to name but a few.

Network architecture 100A of the 5G network includes a Service-Based Architecture (SBA) which may provide a modular framework from which common applications can be deployed using components of varying sources and suppliers. The SBA of the 5G network may be configured such that control plane functionality and common data repositories are provided by way of a set of interconnected NFs, each with authorization to access each other's services.

Accordingly, CCNF 105 includes a plurality of NFs which commonly support all sessions for UE 102. UE 102 may be connected to and served by a single CCNF 105 at a time, although multiple sessions of UE 102 may be served by different slice-specific core network functions 106. CCNF 105 may include, for example, an Access and Mobility Management Function (AMF) and a Network Slice Selection Function (NSSF). UE-level mobility management, authentication, and network slice instance selection are examples of functionalities provided by CCNF 105. On the other hand, slice-specific core network functions 106 of the network slices may be separated into control plane (CP) NFs 108 and user plane (UP) NFs 110. In general, the user plane carries user traffic while the control plane carries network signaling. CP NFs 108 are shown in FIG. 1A as CP NF 1 through CP NF n, and UP NFs 110 are shown in FIG. 1A as UP NF 1 through UP NF n. CP NFs 108 may include, for example, a Session Management Function (SMF), whereas UP NFs 110 may include, for example, a User Plane Function (UPF).

Figure 1B:
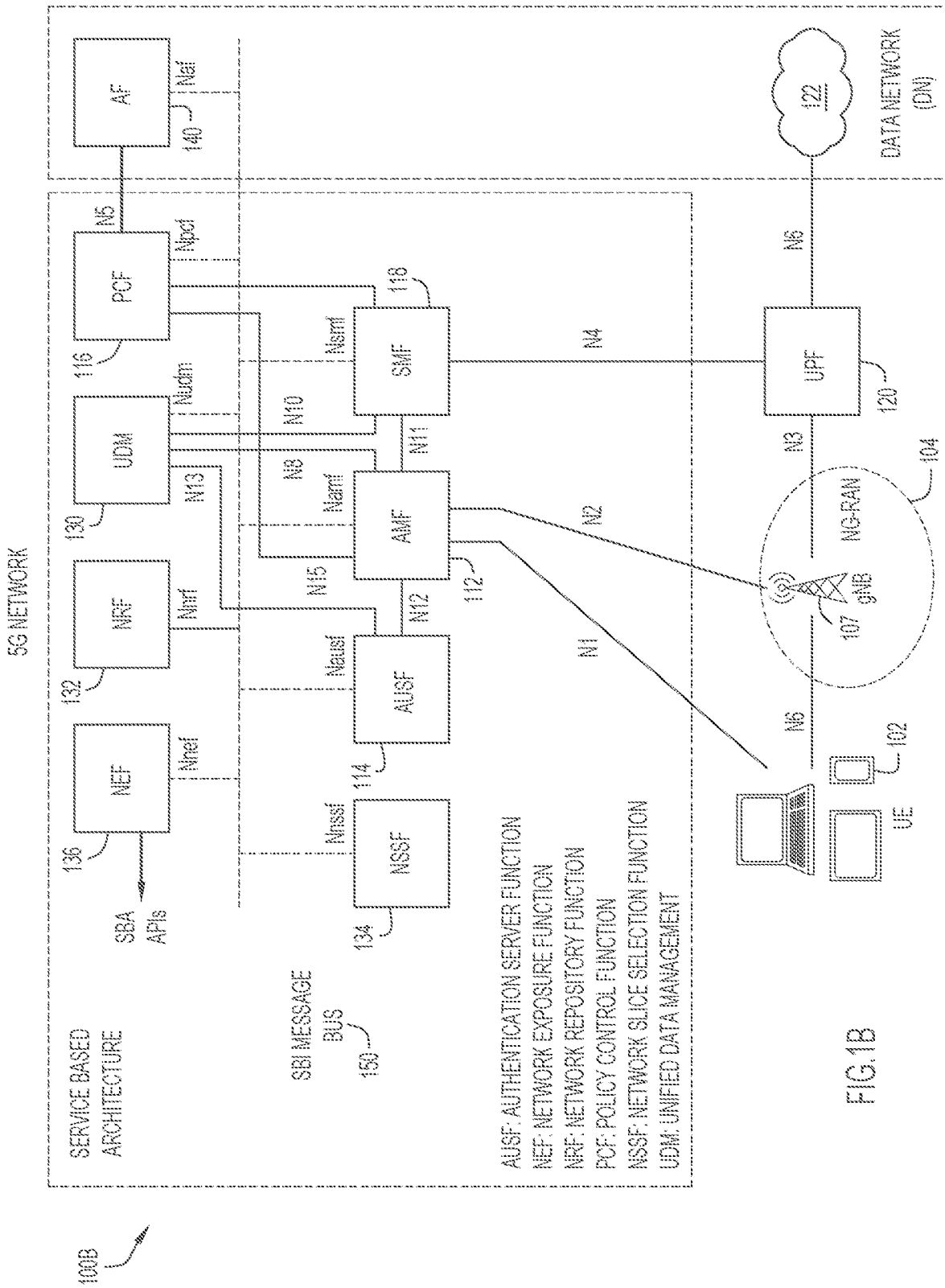
FIG. 1B is an illustrative representation of a more detailed network architecture of the 5G network of FIG. 1A, showing a Service-Based Architecture (SBA) or an enhanced SBA (eSBA) of the 5G network.

FIG. 1B is an illustrative representation of a more detailed network architecture 100B of the 5G network of FIG. 1A. As provided in Third Generation Partnership Project (3GPP) standards for 5G (e.g. 3GPP Technical Specifications or "TS" 23.501 and 23.502), network architecture 100B for the 5G network may include an AMF 112, an Authentication Server Function (AUSF) 114, a Policy Control Function (PCF) 116, an SMF 118, and a UPF 120 which may connect to a Data Network (DN) 122. Other NFs in the 5G network include an NSSF 134, a network exposure function (NEF) 136, an NF repository function (NRF) 132, and a Unified Data Management (UDM) function 130. A plurality of interfaces and/or reference points N1-N8, N10-N13, and N15 shown in FIG. 1B (as well as others) may define the communications and/or protocols between each of the entities, as described in the relevant (evolving) standards documents.

In FIG. 1B, UPF 120 is part of the user plane and all other NFs (i.e. AMF 112, AUSF 114, PCF 116, SMF 118, and UDM 130) are part of the control plane. Separation of user and control planes guarantees that each plane resource may be scaled independently. It also allows UPFs to be deployed separately from CP functions in a distributed fashion. The NFs in the CP are modularized functions; for example, AMF 112 and SMF 118 may be independent functions allowing for independent evolution and scaling.

For communications of UE 102 via UPF 120, SMF 118 may maintain a Packet Forward Control Protocol (PFCP) session with UPF 120 over an N4 interface. An N4 connection may be established for every Protocol Data Unit (PDU) session that is created by UE 102 so that SMF 118 may control the session.

The SBA of the 5G network is better illustrated in FIG. 1, again whereby the control plane functionality and common data repositories are provided by way of the set of interconnected NFs. Assuming the role of either service consumer or service producer, NFs may be self-contained, independent and reusable. With the SBA, each NF service may expose its functionality through a Service Based Interface (SBI) message bus 150. SBI message bus 150 may employ a Representational State Transfer (REST) interface (e.g. using Hypertext Transfer Protocol "HTTP" 2.0). As indicated in FIG. 1i, the SBI interfaces of SBI message bus 150 may include an Namf for AMF 112, an Nausf for AUSF 114, an Npcf for PCF 116, an Nsmf for SMF 118, an Nudm for UDM 130, an Nnrf for NRF 132, an Nnssf for NSSF 134, an Nnef for NEF 136, and an Naf for AF 140.

Network slicing brings a high degree of deployment flexibility and efficient resource utilization when deploying diverse network services and applications. NSSF 134 may facilitate network slicing in the 5G network, as it operates to select network slice instances (NSIs) for UEs. A logical, end-to-end network slice may have predetermined capabilities, traffic characteristics, and service level agreements (SLAs), and may include the virtualized resources required to service the needs of a Mobile Virtual Network Operator (MVNO) or group of subscribers, including a dedicated UPF 120, SMF 118, and PCF 116.

UDM 130 may provide services to SBA functions, such as AMF 112, SMF 118 and NEF 136. UDM 130 is typically recognized as a stateful message store, holding information in its local memory. Alternatively, UDM 130 may be stateless, storing information externally within a Unified Data Repository (UDR). UDM 130 may be considered to be analogous to a Home Subscriber Server (HSS), providing authentication credentials while being employed by AMF 112 and SMF 118 to retrieve subscriber data and context.

One or more application functions, such as an Application Function (AF) 140 may connect to the 5G network. AF 140 may interact with the network via NEF 136 in order to access network capabilities. NEF 136 may securely expose network capabilities and events provided by NFs to AF 140, and may provide a means for AF 140 to securely provide information to the 5G network.

In general, an "NF instance" is an identifiable instance of an NF. NRF 132 may maintain NF profiles of available NF instances and their associated services, and support a service discovery function for service discovery associated with the NF profiles. NF profiles of NF instances maintained in NRF 132 may include NF instance ID, NF type (e.g. AMF, SMF, PCR, UPF, etc.), network slice identifiers such as NSI ID, NF capacity information, names of supported services, etc. For service discovery, NRF 132 may receive a discovery request from an NF instance and provide information associated with the discovered NF instance to the NF instance in response.

The eSBA architecture for a 5G network was introduced in 3GPP TS 23.501 for Release 16. The eSBA architecture introduced what are referred to as an NF Set and an NF Service Set (see e.g. 3GPP TS 29.244, Release 16, 17, and beyond). An NF Set is a group of interchangeable NF instances of the same type, supporting the same services and the same network slice. The NF instances of the same NF Set may be geographically distributed but have access to the same context data. On the other hand, an NF service is a functionality exposed by an NF through the SBI and consumed by other authorized NFs. An NF service instance is an identifiable instance of an NF service, and an NF service operation is an elementary unit of which an NF service is composed. An NF Service Set is a group of interchangeable NF service instances of the same service type within an NF instance. The NF service instances in the same NF Service Set have access to the same context data.

Figure 2:
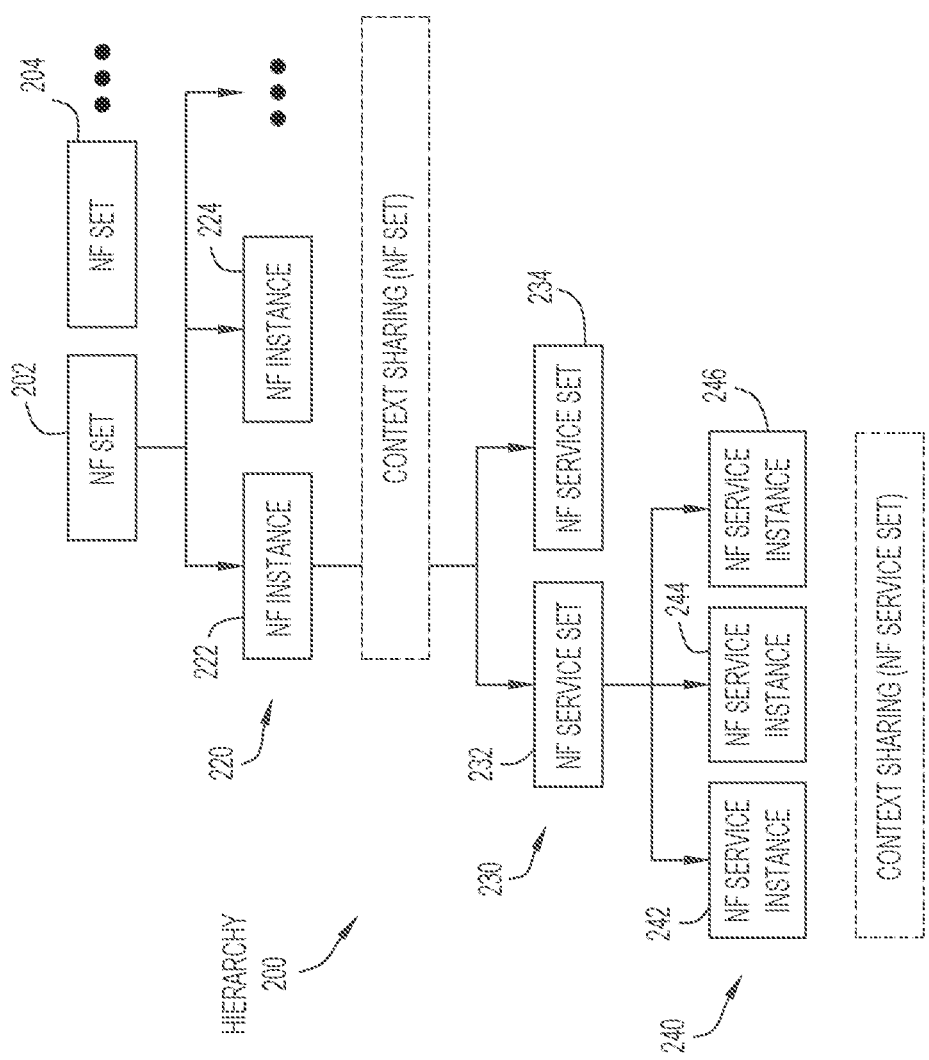
FIG. 2 is an illustration of a network function (NF) hierarchy of an NF Set, which includes NF instances, NF Service Sets and NF service instances.

FIG. 2 is an illustration of a hierarchy 200 of an NF Set 202. NF Set 202 may be associated with a plurality of NF instances 220 (e.g. an NF instance 222 and an NF instance 224). As illustrated, NF instance 222 of NF Set 202 is configured to have access to context data for processing, and NF instance 224 of the same NF Set 202 is configured to have access to the same context data for processing as the NF instance 222 (e.g. whether such access involves the same or different physical memory or location). The plurality of NF instances 220 of NF Set 202 are distinguishable from NF instances of an NF Set 204. For example, the plurality of NF instances 220 of NF Set 202 do not have access to the same context data as NF instances of NF Set 204.

An NF instance may be associated with a plurality of different NF Service Sets. For example, NF instance 222 may be associated with a plurality of NF Service Sets 230 (e.g. an NF Service Set 232 and an NF Service Set 234). An NF Service Set may be associated with a plurality of different NF service instances. In the example of FIG. 2, NF Service Set 232 may be associated with a plurality of NF service instances 240 (e.g. an NF service instance 242, an NF service instance 244, and an NF service instance 246). As illustrated, NF service instance 242 of NF Service Set 232 is configured to have access to context data for processing, and NF service instances 244 and 246 of the same NF Service Set 232 are configured to have access to the same context data for processing as the NF service instance 242 (e.g. whether such access involves the same or different physical memory or location). The plurality of NF service instances 240 of NF Service Set 232 are distinguishable from NF service instances of NF Service Set 234. For example, the plurality of NF service instances 240 of NF Service Set 232 do not have access to the same context data as NF service instances of NF Service Set 234.

An NF service is one type of capability exposed by an NF (e.g. an NF service "producer") to other authorized NFs (e.g. one or more NF service "consumers"). 3GPP TS 23.501 defines the roles of consumer and producer NFs. A consumer is the NF which requests a related service, while the NF which exposes the requested service is the producer. A target Uniform Resource Indicator (URI) may be used to access an NF service of an NF service producer (e.g. to invoke service operations). An endpoint address may be used to determine a host/authority part of a target URI. The endpoint address may be an address in the format of an IP address or Fully-Qualified Domain Name (FQDN). Each NF (service) instance in an NF (Service) Set may expose a different resource URI, provided to the NRF in NF profile information that is received during registration.

Again, for communications of a UE, an SMF may maintain a PFCP session with a UPF over an N4 interface. Such an N4 connection may be established for every PDU session created by the UE so that the SMF may control the session. Since 3GPP Release 16 introduced the concept of a NF Set, where all NF instances within the NF Set are able to share the same user context data of a UE, an SMF instance may be part of an SMF Set of multiple SMF instances that share the same user context data of the UE. Given the multiple SMF instances of an SMF Set, and the potential use of multiple UPF instances in actual deployment, the number of N4 connections between SMFs and UPFs multiply such that SMF connection management becomes overcomplicated. Note that, as N4 transactions occur for each PDU session of a given UE, SMF instance pinning occurs at the PDU session level. Hence, multiple PDU sessions of a UE may be spread across multiple SMF instances within the SMF Set.

Figure 3:
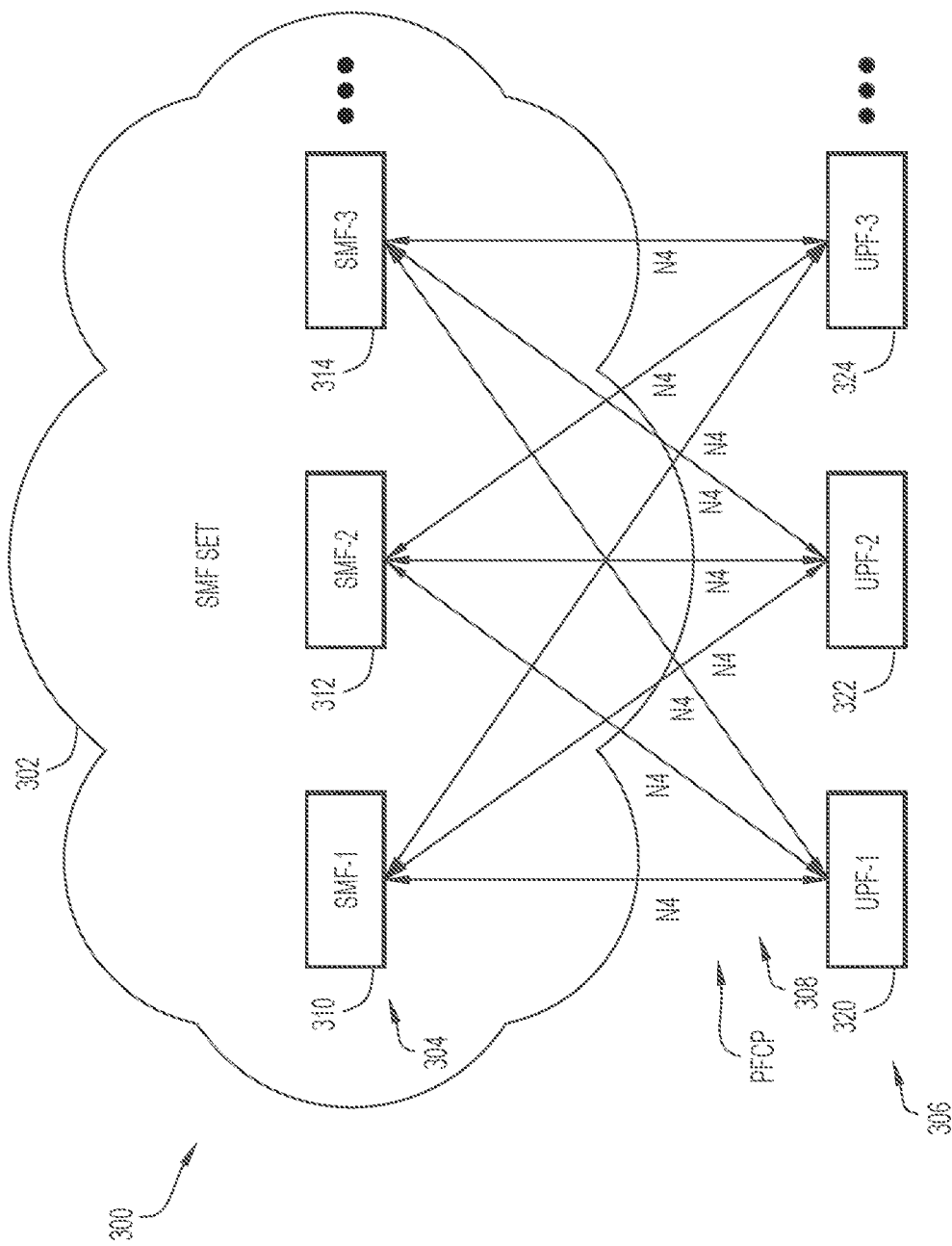
FIG. 3 is an illustrative representation of an example scenario of an interfacing arrangement between a plurality of Session Management Function (SMF) instances of an SMF Set and a plurality of User Plane Function (UPF) instances according to a current standard architecture.

To better illustrate, FIG. 3 is an illustrative representation of an example scenario of an interfacing arrangement 300 between a plurality of SMF instances 304 of an SMF Set 302 and a plurality of UPF instances 306 according to the current standard architecture. In the example scenario, the plurality of SMF instances 304 of SMF Set 302 includes SMF instances 310, 312, and 314 (or SMF-1, SMF-2, and SMF-3, respectively), and the plurality of UPF instances 306 includes UPF instances 320, 322, and 324 (or UPF-1, UPF-2, and UPF-3, respectively). As illustrated, each one of the SMF instances 304 may have an N4 connection for communication via PFCP with each one of the UPF instances 306, resulting in a plurality of N4 connections 308. As is apparent, the number of the N4 connections 308 between SMF instances 304 and UPF instances 306 becomes large such that SMF connection management becomes overcomplicated. Note that this complex connection management issue will also exist in relation to the Sx interface between the Packet Data Network (PDN) Gateway (GW) Control Plane (PGW-C) and the user plane, for the Evolved Packet Core (EPC) which is Fourth Generation (4G) technology.

What are described herein are techniques and mechanisms for providing a PFCP message service using a Remote Procedure Call (RPC)-based protocol, which is suitable to facilitate PFCP connection sharing by SMF instances of an SMF Set. The techniques and mechanisms of the present disclosure may provide for reducing or minimizing connections amongst SMFs and UPFs. The PFCP message service may serve to provide a shared or common termination function for multiple SMF instances of an SMF Set, as a shared or common PFCP termination point for the communication of PFCP messages over an N4 interface(s) to an UPF instance(s) for PDU sessions of a UE.

In general, RPC is a client-server mechanism that enables an application on one machine to make a procedure call to code on another machine. As one example, a client may call a local procedure, which may be referred to as a client stub or stub routine, which packs its arguments into a message and sends them across the network to a particular server process. The client-side stub routine may then block. Meanwhile, the server may unpack the message, call the procedure, pack the results into a message, and send the results back to the client stub. The client stub may then unblock, receive the message, unpack the results of the RPC, and return them to the caller.

Preferably, the RPC-based protocol utilized for PFCP connection sharing according to the present disclosure is a high-performance RPC-based protocol. In some implementations, the RPC-based protocol utilizes an underlying transport protocol which is or is based on HTTP 2.0 (or "HTTP/2") or greater. In some implementations, the RPC-based protocol may be or include gRPC Remote Procedure Call (gRPC) or a gRPC protocol. In some implementations, the RPC-based protocol may be or include Quick User Datagram Protocol (UDP) Internet Connections (QUIC) or a QUIC protocol, which is essentially a multiplexed stream transport over UDP.

gRPC is a lightweight and high-performant framework that is based on RPC. gRPC utilizes HTTP/2 for its transport protocol. HTTP/2 includes advances capabilities including a binary framing protocol for data transport (e.g. in contrast to text-based), multiplexing support for sending multiple parallel requests over the same connection, bidirectional full-duplex communication for sending both client requests and server responses simultaneously, and header compression. Notably, request and response multiplexing is made possible in HTTP/2 with the introduction of a new HTTP/2 layer that is referred to as binary framing. gRPC also embraces an open-source technology referred to as Protocol Buffers which provides a highly-efficient and platform-neutral serialization format for serializing structured messages that services send to each other. Developers may define a service contract for each microservice using a cross-platform Interface Definition Language (IDL). The contract, which may be implemented as a text-based .proto file, describes the methods, inputs, and outputs for each service. The same contract file may be used for gRPC clients and services built on different development platforms.

Figure 4:
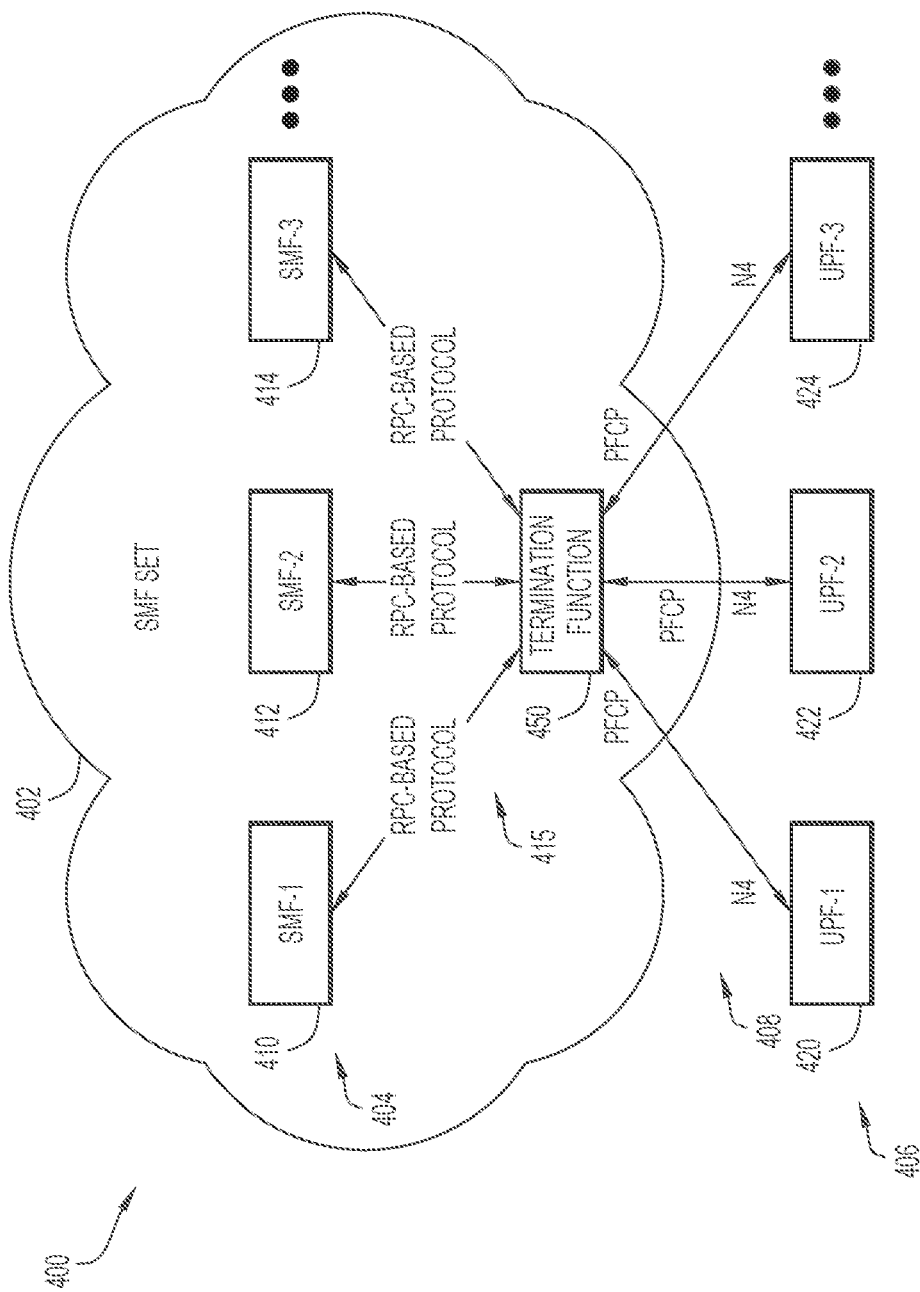
FIG. 4 is an illustrative representation of an example scenario of an interfacing arrangement between a plurality of SMF instances of an SMF Set and a plurality of UPF instances utilizing a termination function according to some implementations of the present disclosure, where the termination function is configured to provide a Packet Forwarding Control Protocol (PFCP) message service using a Remote Procedure Call (RPC)-based protocol (e.g. a gRPC Remote Procedure Call or "gRPC"), which is suitable to facilitate PFCP connection sharing.

FIG. 4 is an illustrative representation of an example scenario of an interfacing arrangement 400 according to some implementations of the present disclosure. Interfacing arrangement 400 of FIG. 4 illustrates an interfacing between a plurality of SMF instances 404 of an SMF Set 402 and a plurality of UPF instances 406 with use of a termination function 450. In the example scenario, the plurality of SMF instances 404 of SMF Set 402 includes SMF instances 410, 412, and 414 (or SMF-1, SMF-2, and SMF-3, respectively), and the plurality of UPF instances 406 includes UPF instances 420, 422, and 424 (or UPF-1, UPF-2, and UPF-3, respectively).

For communication with each one of SMF instances 404, termination function 450 may include a server configured with a RPC-based protocol for a PFCP message service. Here, a plurality of RPC-based protocol connections 415 may be provided between SMF instances 404 and termination function 450. In some implementations, each one of SMF instances 404 may utilize (e.g. only) a single RPC-based protocol connection with termination function 450. On the other hand, for communication with each one of UPF instances 406, termination function 450 may further include a PFCP message handling client (not shown in FIG. 4) for maintaining an N4 connection with each one of UPF instances 406, communicating according to the PFCP. Here, a plurality of N4 connections 408 using PFCP may be provided between termination function 450 and UPF instances 406. In some implementations, termination function 450 may utilize (e.g. only) a single N4 connection for PFCP with each one of the UPF instances 406.

As is apparent, the PFCP message service utilizing the RPC-based protocol (e.g. gRPC) may be suitable to facilitate PFCP connection sharing by SMF instances 404 of SMF Set 402, for reducing or minimizing connections amongst SMFs and UPFs (e.g. compare the interfacing arrangement of 400 of FIG. 4 with interfacing arrangement 300 of FIG. 3). Thus, termination function 450 may serve as a common or shared termination (an "N4 termination function") that is outside of and shared amongst all SMF instances 404 of SMF Set 402. Note that this common or shared termination function may also be used in relation to the Sx interface between the PGW-C and the user plane for the EPC which is 4G technology. Throughout the description, however, this Sx/N4 termination function may be referred to simply and more generally as a "termination function."

Thus, in some implementations, termination function 450 (e.g. the N4/Sx termination function) may serve as a PFCP protocol termination point, separated from and shared amongst all of the (active) SMF instances 404 running within SMF Set 402, terminating the PFCP connection for each one of SMF instances 404. In some implementations, termination function 450 is a light-weight and stateless function which needs not store any UE or session context.

In some implementations, termination function 450 may operate as an interworking function which converts the messages from a proprietary interface with SMF instances 404 to a standard PFCP-based N4 interface with UPF instances 406, and vice-versa. Here, SMF instances 404 within SMF Set 402 may utilize this interworking function to save the burden of maintaining an N4 connection context individually. This not only simplifies SMF design, but also saves the mesh N4 connectivity between SMF instances and UPF instances, which ultimately helps to improve system performance.

In some implementations, as there is a single termination function per SMF Set 402, each one of SMF instances 404 of SMF Set 402 may be preconfigured with endpoint address information of termination function 450. Here, discoverability of termination function 450 is unnecessary. In other implementations, termination function 450 may be discoverable with use of any suitable mechanism for discovery. In addition, redundancy may be provided for termination function 450 according to some implementations. Here, a simple 1:1 redundancy may be provided in a relatively straightforward manner, as termination function 450 is or may be a (fairly) stateless entity according to some implementations (i.e. it need not store any UE or session context information).

Figure 5:
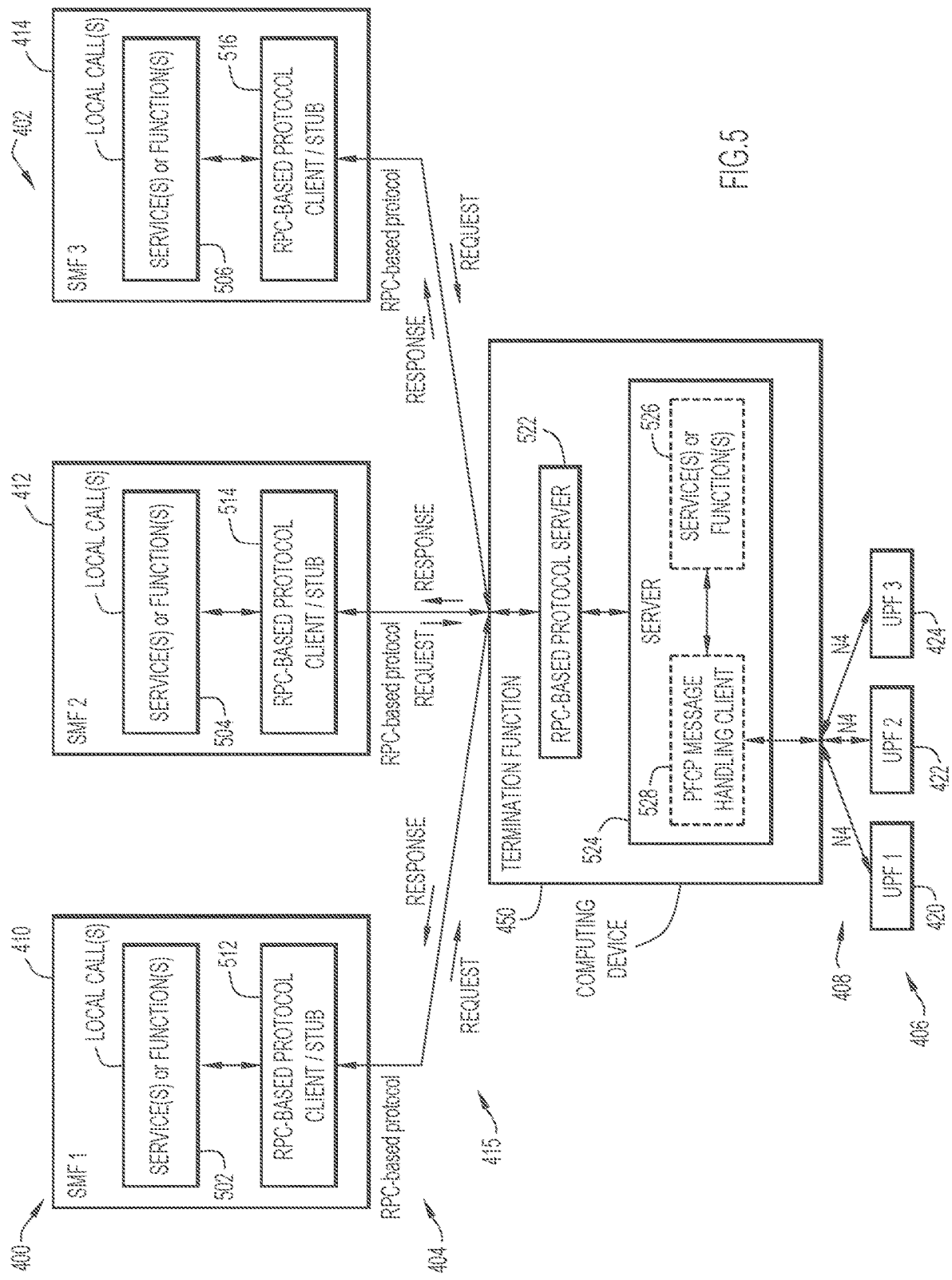
FIG. 5 is an illustrative representation of the interfacing arrangement of FIG. 4 according to some implementations of the present disclosure, with additional functional or module detail provided in relation to the termination function and the SMF instances.

FIG. 5 is an illustrative representation of interfacing arrangement 400 of FIG. 4 according to some implementations of the present disclosure, showing additional functional or module or detail for termination function 450 and SMF instances 404 of SMF Set 402. In FIG. 5, termination function 450 may operate as a shared termination function for SMF instances 404 of SMF Set 402, interfacing with UPFs instances 406 with which PFCP sessions may be maintained. As illustrated in FIG. 5, termination function 450 may be implemented as a computing device having an RPC-based protocol server 522 configured with a RPC-based protocol for facilitating a PFCP message service. RPC-based protocol server 522 may be provided for serving a plurality of RPC-based protocol client stubs 512, 514, and 516 respectively situated at SMF instances 410, 412, and 414. The PFCP message service may be accessed by each one of SMF instances 410, 412, and 414 through local calls to each one of services or functions 502, 504, and 506, respectively, which invoke remote procedure calls to RPC-based protocol server 522.

The PFCP message service may be facilitated at termination function 450 of the computing device with use of a server 524 having services or functions 526 that include the PFCP message service. RPC-based protocol server 522 may operate or interface with a PFCP message handling client 528 of server 524 for handling PFCP communications with UPF instances 406 (e.g. sending and receiving tasks; any formatting, re-formatting, or unformatting tasks; any addressing or re-addressing tasks, etc.). Note that, at the computing device, RPC-based protocol server 522 and server 524 may be provided as part of the same server or function or as separate servers or functions.

In some implementations, the computing device having RPC-based protocol server 522 of FIG. 5 is configured with an RPC-based protocol that utilizes an underlying transport protocol which is or is based on HTTP 2.0 or greater. In some preferred implementations, the computing device having RPC-based protocol server 522 is configured with an RPC-based protocol which may be or include gRPC. In some implementations, the computing device having RPC-based protocol server 522 is configured with an RPC-based protocol that utilizes QUIC.

Figure 6:
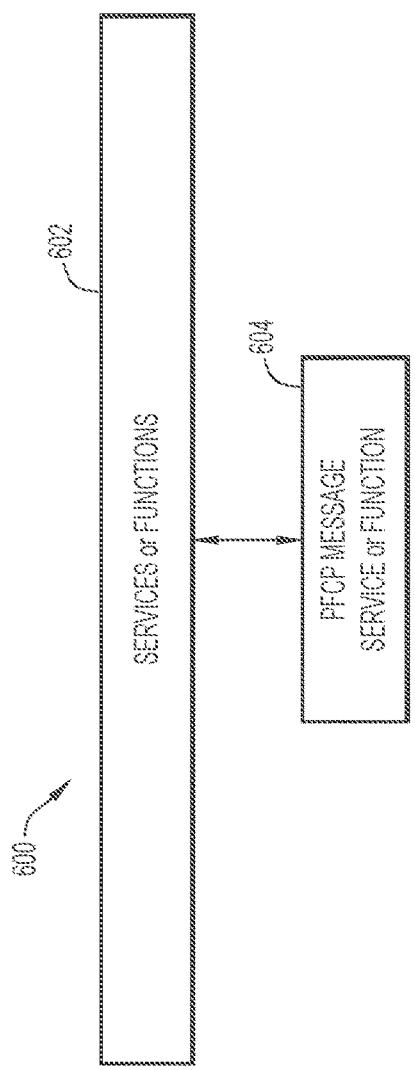
FIG. 6 is an illustrative representation of one or more services or functions which may be provided with use of an RPC-based protocol according to some implementations, where the one or more services or functions may simply be or include a PFCP message service or function.

FIG. 6 is an illustrative representation 600 of one or more services or functions 602 which may be provided with use of an RPC-based protocol according to some implementations (e.g. for services or functions 502, 504, and 506 of FIG. 5). In this simple example, the one or more services or functions 602 may simply be or include a PFCP message service or function 604. PFCP message service or function 604 may be associated with the communication of all (or some or most) of the different message types for PFCP communication (see e.g. 3GPP TS 29.244).

Figure 7:
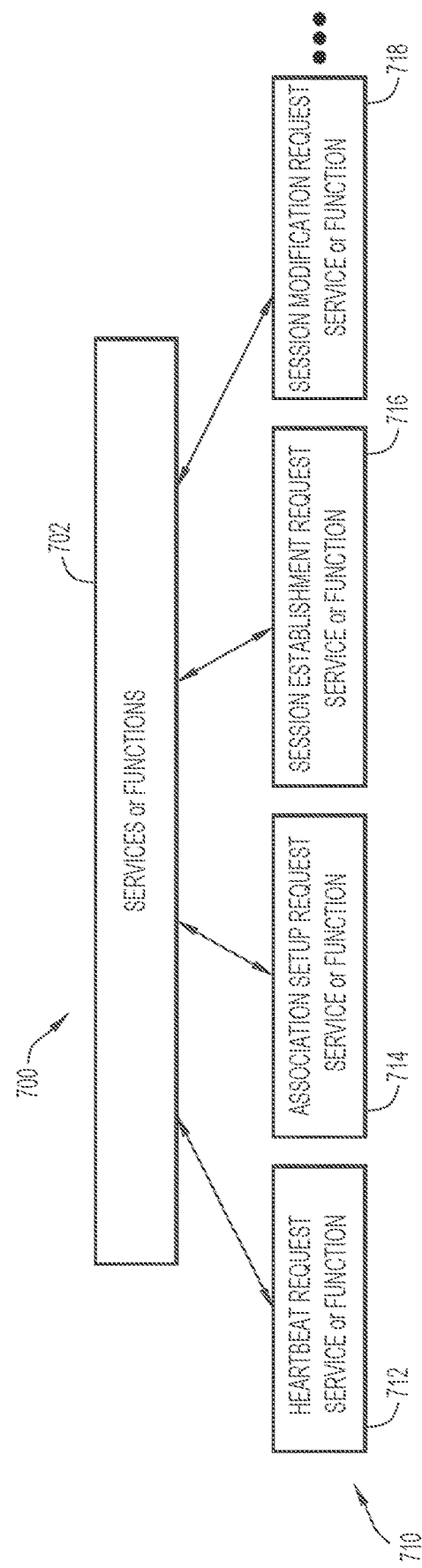
FIG. 7 is an illustrative representation of one or more services or functions which may be provided with use of an RPC-based protocol according to some implementations, where the one or more services or functions may include a plurality of different PFCP message services or functions.

FIG. 7 is an illustrative representation 700 of one or more services or functions 702 which may be provided with use of an RPC-based protocol according to some implementations (e.g. again for services or functions 502, 504, and 506 of FIG. 5), where the one or more services or functions 702 may include a plurality of different PFCP message services or functions 710. Here, the plurality of PFCP message services or functions 710 may include services or functions for PFCP node related messages and PFCP session related messages. As indicated in FIG. 7, these services or functions 710 may include a "heartbeat request" service or function 712, an "association setup request" service or function 714, a "session establishment request" service or function 716, a "session modification request" service or function 718, and so on. Each one of the plurality of PFCP message services or functions 710 may be associated with a different one of a plurality of message types of PFCP messages (heartbeat request=1; association setup request=5; session establishment request=50; session establishment response=51; etc.; see e.g. 3GPP TS 29.244).

Now with reference back to FIG. 5, the server(s) configured with the RPC-based protocol for the PFCP message service (e.g. RPC-based protocol server 522 and server 524 of FIG. 5) may perform processing associated with each RPC-based protocol client stub 512, 514, and 516 of a respective SMF instance 410, 412, or 414 as follows. RPC-based protocol server 522 may receive an RPC-based protocol message which indicates a request; unpack (or unmarshall) the RPC-based protocol message which indicates the request for obtaining PFCP message request data; and operate or interface with server 524 having PFCP message handling client 528 for sending a PFCP message having the PFCP message request data to an indicated one of UPF instances 420, 422, and 424. In response, RPC-based protocol server 522 may operate or interface with server 524 having PFCP message handling client 528 to receive a PFCP message which indicates a response from the indicated one of UPF instances 420, 422, and 424, where the PFCP message which indicates the response including PFCP message response data; pack (or marshall) the PFCP message response data into an RPC-based protocol message which indicates a response; and send the RPC-based protocol message which indicates the response to the respective SMF instance 410, 412, or 414 (i.e. via its respective RPC-based protocol client stub 512, 514, or 516).

Figure 8:
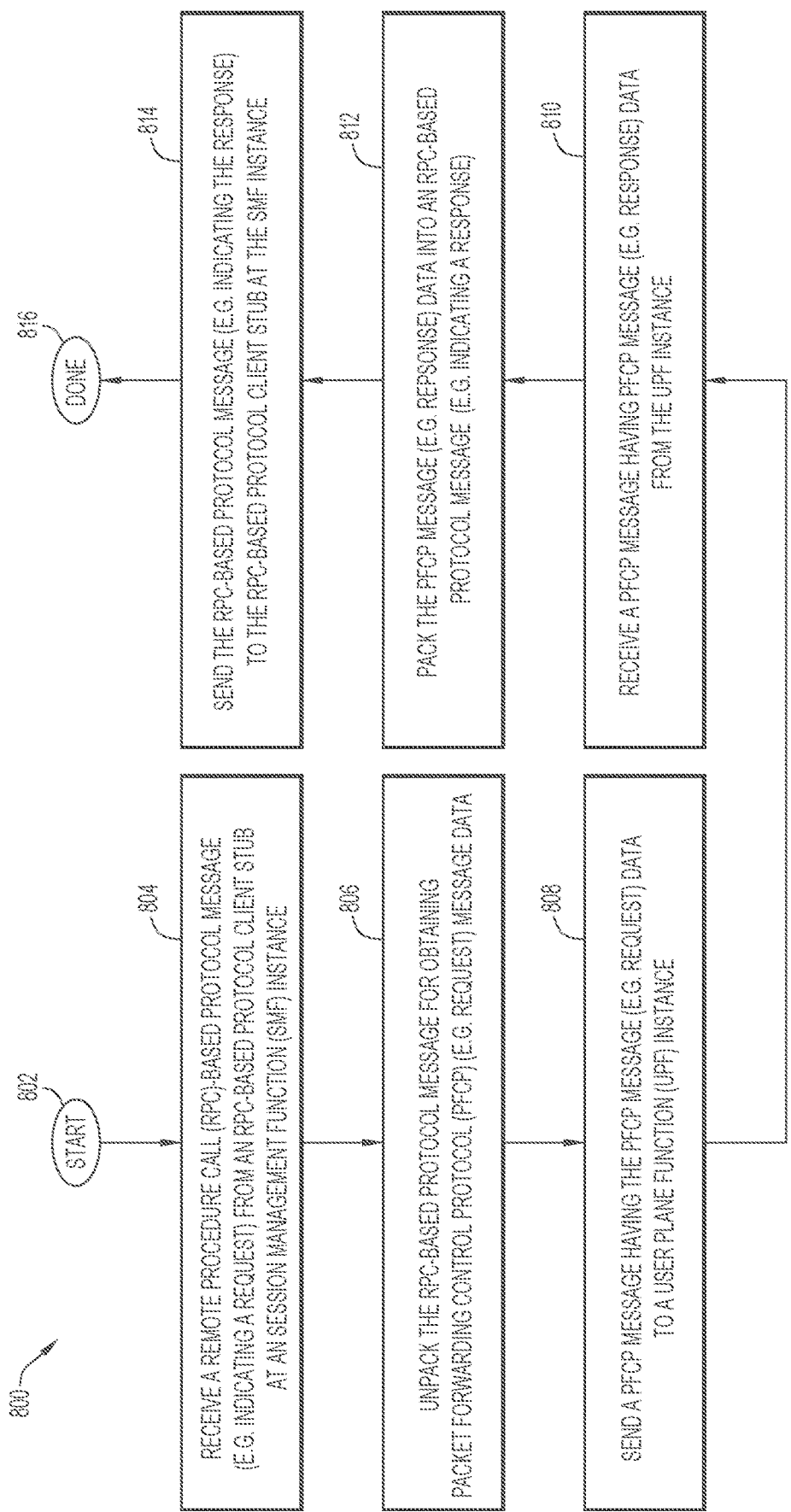
FIG. 8 is a flowchart for describing a method of providing a PFCP message service using a RPC-based protocol, which is suitable for PFCP connection sharing according to some implementations of the present disclosure.

With reference now to FIG. 8, a flowchart 800 for describing a method of providing a PFCP message service using a RPC-based protocol for PFCP connection sharing according to some implementations of the present disclosure is shown. In some implementations, a computing device or network node may include at least one or more interfaces configured to connect to a network for communication, one or more processors, one or more memory elements coupled to the one or more processors, and instructions stored in the one or more memory elements. The computing device or network node may have one or more servers configured with the RPC-based protocol for the PFCP message service. The method may be embodied as a computer program product including a non-transitory computer readable medium (e.g. one or more memory elements) and instructions stored in the computer readable medium, where the instructions are executable on one or more processors for performing the steps of the method. In some implementations, the instructions stored in the one or more memory elements may be executable on the one or more processors for operating the one or more servers configured with the RPC-based protocol for the PFCP message service.

Initially, an SMF instance may perform a local call to a service or function of the RPC-based protocol. The service or function may be a PFCP message service for communicating a PFCP message to a UPF instance. For example, the local call may be for communicating a PFCP message which indicates a session establishment request to the UPF instance. The local call may invoke a remote procedure call with use of an RPC-based protocol "client stub" at the SMF instance. The service or function may pass data and arguments to the RPC-based protocol client stub, where the data or arguments include PFCP message data (e.g. PFCP header information and Information Element "IE" information, and may further include IP address header information). The RPC-based protocol client stub at the SMF instance may then pack (or marshall) data into an RPC-based protocol message. The packing may include serialization of the data into a binary format. The RPC-based protocol message may be sent to the computing device having the server configured with the RPC-based protocol for the PFCP message service, which may serve as a common or shared termination function for a plurality of SMF instance of an SMF Set.

Beginning at a start block 802 of FIG. 8, the computing device having the server configured with the RPC-based protocol for the PFCP message service may receive the RPC-based protocol message from the RPC-based protocol client stub at the SMF instance (step 804 of FIG. 8). The RPC-based protocol message may indicate a request. The computing device may unpack (or unmarshall) the RPC-based protocol message for obtaining the data (e.g. PFCP message data) (step 806 of FIG. 8). The PFCP message data may be or include PFCP message request data. The unpacking may include deserialization of the data. The computing device may then send a PFCP message having the PFCP message data to a UPF instance over an N4 connection (step 808 of FIG. 8). The PFCP message may indicate a PFCP request and include the PFCP message request data. In some implementations, the computing device may send the PFCP message having the PFCP message data to the UPF instance by operating or interfacing with a PFCP message handling client.

The UPF instance may receive and process the PFCP message which indicates the PFCP request. In response to the processing, the UPF instance may generate a PFCP message which indicates a PFCP response and send the PFCP message to the computing device. The PFCP message which indicates the PFCP response includes PFCP message response data.

The computing device may then receive from the UPF instance the PFCP message which indicates the PFCP response having the PFCP message response data (step 810 of FIG. 8). The PFCP message response data may include PFCP header information and IE information. The computing device may pack (or marshall) the PFCP message which indicates the PFCP response into an RPC-based protocol message (step 812 of FIG. 8). The packing may include serialization of data into the binary format. The RPC-based protocol message may indicate a response. The computing device may send the RPC-based protocol message which indicates the response to the RPC-based protocol client stub at the SMF instance (step 814 of FIG. 8).

The RPC-based protocol client stub at the SMF instance may receive the RPC-based protocol message which indicates the response. The RPC-based protocol client stub may unpack (or unmarshall) the RPC-based protocol message for obtaining the data (e.g. the PFCP message response data). The unpacking may include deserialization of the data. Thus, the PFCP message response data including the PFCP header information and the IE information may be obtained. These data may be provided as the response to the local call to the service or function. The method of the flowchart 800 is completed as indicated in a done block 816 of FIG. 8.

In some implementations, the RPC-based protocol utilizes an underlying transport protocol which is or is based on HTTP 2.0 or greater. In some preferred implementations, the RPC-based protocol may be or include a gRPC protocol. In some implementations, the RPC-based protocol utilizes a QUIC protocol. In some implementations, a RPC-based protocol message may carry multiple requests or multiple responses with use of a binary framing in HTTP 2.0 or greater, which increases message communication efficiency.

In some implementations, the computing device having the server configured with the RPC-based protocol for the PFCP message service may be configured to perform the method to serve a plurality of SMF instances of an SMF Set. Thus, in some implementations, the method may repeat the performing of the receiving in step 804, the unpacking in step 806, and the sending in step 808 (and so on), for each subsequent message of a plurality of a subsequent RPC-based protocol messages received from each RPC-based protocol client stub of a plurality of RPC-based protocol client stubs respectively situated at the plurality of SMF instances of the SMF Set. In some implementations, sending the PFCP message having the PFCP message data to the UPF instance in step 808 may involve sending the PFCP message to an indicated one of one or more UPF instances with which PFCP sessions of the plurality of SMF instances of the SMF Set are maintained.

In some implementations, the RPC-based protocol message which indicates the request and includes the PFCP message request data received in step 804 includes serialized PFCP message request data in binary format, and the unpacking of the RPC-based protocol message which indicates the request in step 806 includes deserializing the serialized PFCP message request data. In some implementations, the RPC-based protocol message which indicates the response and includes the PFCP message response data received in step 810 includes deserialized PFCP message response data, and the packing of the RPC-based protocol message which indicates the response in step 812 includes serializing the deserialized PFCP message response data into the binary format.

FIGS. 9-12 are provided to better illustrate the general underlying messaging and processing associated with use of an RPC-based protocol that is based on gRPC as well as the PFCP protocol. In FIG. 9, a diagram of an example of a protocol stack 900 for gRPC which may be utilized for the PFCP message service according to some implementations is shown. In this example, protocol stack 900 for gRPC in FIG. 9 is based on gRPC-Go. Protocol stack 900 based on gRPC-Go may include an application layer 902, a generated stubs layer 904, a gRPC Go Core and Interceptors layer 906, an HTTP/2 layer 908, a security layer 910 (e.g. for Secure Sockets Layer "SSL," Transport Security Layer "TLS," or Application Layer Transport Security "ALTS"), a Transport Control Protocol (TCP) layer 912, and a Unix domain sockets layer 914. Unix domain sockets layer 914 may be referred to as an inter-process communication (IPC) socket which is a data communications endpoint for exchanging data between processes executing on the same host system. In other implementations, the protocol stack that is utilized may be based on the gRPC C-core.

In FIG. 10, a diagram of a protocol stack 1000 for a control plane over an N4 connection or reference point that utilizes PFCP is shown. Protocol stack 1000 for the control plane over the N4 connection or reference point includes a PFCP layer 1002, a User Datagram Protocol (UDP) layer 1004, an IP layer 1006, a layer-2 (L2) layer 1008, and a layer-1 (L1) layer 1010.

In FIG. 11, an illustrative example of a message which indicates a gRPC request 1100 according to the gRPC protocol is shown. The message which indicates the gRPC request 1100 may include headers 1102 and data 1104. Headers 1102 may include flags, a method (e.g. POST), a scheme (e.g. HTTPS), a path (e.g. /UPF1.network/communicate), an authority (e.g. grpc-demo), and content-type (e.g. application/grpc+PFCP). In FIG. 12, an illustrative example of a message which indicates a gRPC response 1200 according to the gRPC protocol is shown. The message which indicates the gRPC response 1200 may include headers 1202, data 1204, and headers 1206 for trailing metadata. Headers 1202 may include flags, status (e.g. 200), and content-type (e.g. application/grpc+PFCP).

Figure 13:
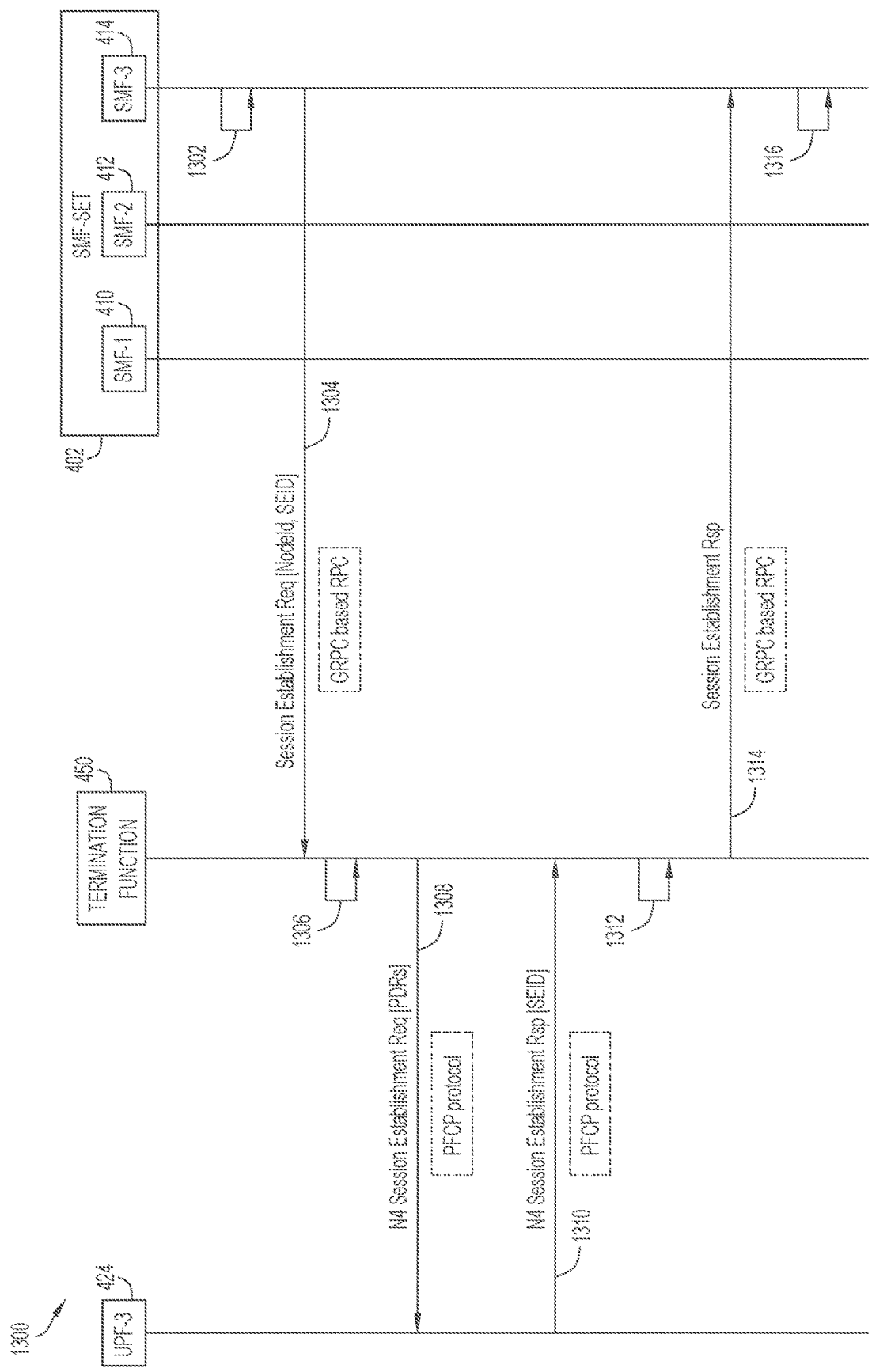
FIG. 13 is a call flow diagram for describing an example of a call flow for session establishment that utilizes a PFCP message service based on a RPC-based protocol according to some implementations of the present disclosure.

FIG. 13 is a call flow diagram 1300 for describing an example of a call flow for session establishment that utilizes a PFCP message service based on a RPC-based protocol according to some implementations of the present disclosure. Call flow diagram 1300 of FIG. 13 is based on the interfacing arrangement described in relation to FIGS. 4 and 5.

In the example of FIG. 13, the PFCP message service is utilized to facilitate a session establishment procedure between SMF instance 414 (i.e. SMF-3) of SMF Set 402 and UPF instance 424 (i.e. UPF-3). Initially, SMF instance 414 may perform a local call to a service or function of the RPC-based protocol, for initiating a session establishment request towards UPF instance 424. The service or function may be a PFCP message service for communicating a PFCP message to UPF instance 424. For example, the local call may be for communicating a PFCP message which indicates the session establishment request for establishing a PDU session at UPF instance 424. The local call may invoke a remote procedure call with use of an RPC-based protocol "client stub" at SMF instance 414 (step 1302 of FIG. 13). The service or function may pass data and arguments to the RPC-based protocol client stub, where the data or arguments include PFCP message data (e.g. PFCP header information and IE information). The RPC-based protocol client stub at SMF instance 414 may then pack (or marshall) data into an RPC-based protocol message. The packing may include serialization of the data into a binary format. The RPC-based protocol message may be sent to termination function 450 having the server configured with the RPC-based protocol for the PFCP message service, or more specifically, an RPC-based protocol server of termination function 450 (step 1304 of FIG. 13).

Termination function 450 (i.e. its RPC-based protocol server) may receive and process the RPC-based protocol message from the RPC-based protocol client stub situated at SMF instance 414 (step 1306 of FIG. 13). Here, termination function 450 may unpack (or unmarshall) the RPC-based protocol message for obtaining the data (e.g. PFCP message request data). The unpacking may include deserialization of the data. The RPC-based protocol server of termination function 450 may then operate or interface with a PFCP message handling client to send a PFCP message which indicates a session establishment request to UPF instance 424 over an N4 connection (step 1308 of FIG. 13). The PFCP message which indicates the session establishment request may include the PFCP message request data. UPF instance 424 may receive and process the PFCP message which indicates the session establishment request.

In response to the processing, UPF instance 424 may generate a PFCP message which indicates a session establishment response and send it to termination function 450 over the N4 connection (step 1310 of FIG. 13). The PFCP message handling client of termination function 450 may receive and process the PFCP message which indicates the session establishment response (step 1312 of FIG. 13). The PFCP message response data may include PFCP header information and IE information. The computing device may pack (or marshall) the PFCP message which indicates the PFCP response into an RPC-based protocol message. The RPC-based protocol message may indicate a response. The packing may include serialization of data into the binary format. The computing device may send the RPC-based protocol message which indicates the response to the RPC-based protocol client stub at the SMF instance (step 1314 of FIG. 13).

The RPC-based protocol client stub at the SMF instance 414 may receive and process the RPC-based protocol message which indicates the response (step 1316 of FIG. 13). The RPC-based protocol client stub may unpack (or unmarshall) the RPC-based protocol message for obtaining the data (e.g. PFCP message data) (step 804 of FIG. 8). The unpacking may include deserialization of the data. Accordingly, the PFCP message response data including the PFCP header information and the IE information may be obtained. The PFCP message response data may be provided as a result, answer or response to the local call to the service or function (e.g. the PFCP message service).

In some implementations, PFCP message data may include a Node ID of an SMF instance and a Session Endpoint Identifier (SEID) of a PFCP session, and these data may be used to pin the request and response messages to the same SMF instance. Accordingly, in some implementations, termination function 450 may maintain mappings between Node IDs of SMF instances (i.e. SMF instance IDs) and SEIDs of the PFCP sessions. In some implementations, termination function 450 may capture information for the mappings via the SMF/UPF messaging for building the mappings between the Node IDs and the SEIDs. In some implementations, in order to identify the appropriate SMF instance on the return path, termination function 450 may perform a search of its mapping table to identify the Node ID associated with the SEID in the PFCP message data.

Figure 14:
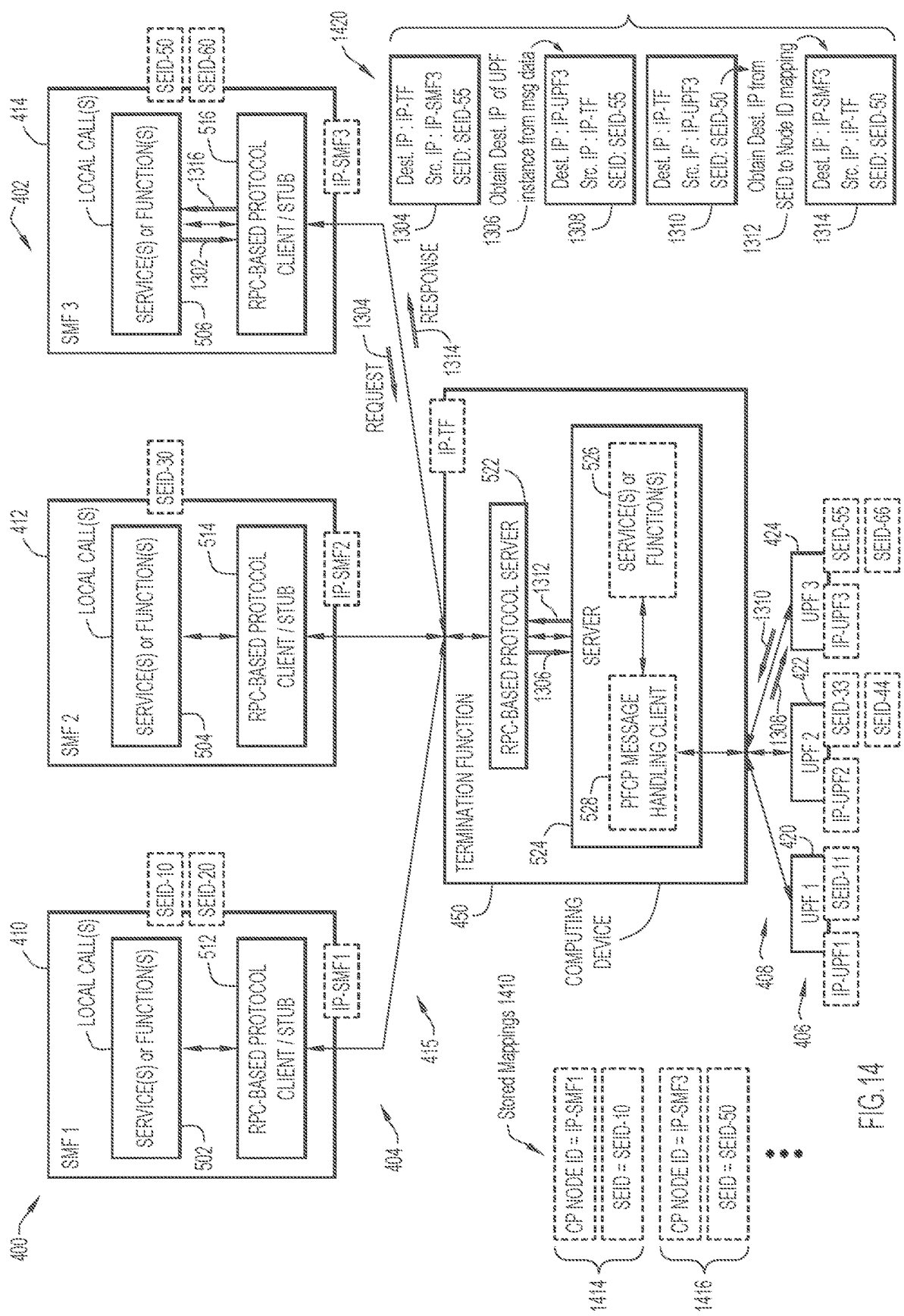
FIG. 14 is an illustrative representation of the interfacing arrangement of FIG. 5 shown with messaging of the call flow of FIG. 13, and further indicating mapping and addressing techniques that may be utilized according to some implementations.

FIG. 14 is an illustrative representation of interfacing arrangement 400 of FIG. 5 shown further with messaging of the call flow of FIG. 13, further indicating mapping and addressing techniques that may be utilized according to some implementations. In FIG. 14, the messaging associated with the call flow of FIG. 13 are illustrated with steps 1302, 1304, 1306, 1308, 1310, 1312, 1314 and 1316. Examples of address information 1420 for the messaging associated with steps 1302, 1304, 1306, 1308, 1310, 1312, 1314 and 1316 are also shown.

With respect to the mapping and addressing techniques, as indicated in FIG. 14, SMF instances 410, 412, and 414 are assigned with node addresses of IP-SMF1, IP-SMF2, and IP-SMF3, respectively. UPF instances 420, 422, and 424 are assigned with node addresses of IP-UPF1, IP-UPF2, and IP-UPF3, respectively. Termination function 450 is assigned with a node address of IP-TF. In addition, SMF instances 410, 412, and 414 have PFCP sessions that are associated with SEIDs, and UPF instances 420, 422, and 424 also have PFCP sessions associated with SEIDs. More particularly, as indicated in FIG. 14, SMF instance 410 has PFCP sessions associated with SEID-10 and SEID-20; SMF instance 412 has a PFCP session associated with SEID-30; and SMF instance 414 has PFCP sessions associated with SEID-50 and SEID-60. UPF instance 420 has a PFCP session associated with a SEID-11; UPF instance 422 has PFCP session associated with SEID-33 and SEID-44; and UPF instance 424 has PFCP sessions associated with SEID-55 and SEID-66.

Termination function 450 may maintain stored mappings 1410 between Node IDs of SMF instances and SEIDs of PFCP sessions for properly addressing the SMF instances 404. In FIG. 14, stored mappings 1410 include a mapping 1414 between Node ID of "IP-SMF1" and SEID of "SEID-10" associated with SMF instance 410 (i.e. SMF-1); and a mapping 1416 between Node ID of "IP-SMF3" and SEID of "SEID-50" associated with SMF instance 414 (i.e. SMF-3).

In step 1306 of FIG. 14, the destination IP address of UPF instance 424 (e.g. IP-UPF3) for sending the PFCP message in step 1308 may be obtained from UDP/IP address header information in the message data. In step 1310 of FIG. 14, the message data will include the SEID (e.g. SEID-50) so that, in step 1312 of FIG. 14, termination function 450 may search the stored mappings 1410 to identify the Node ID (e.g. IP-SMF3) associated with the SEID (i.e. SEID-50) in mapping 1416.

Figure 15:
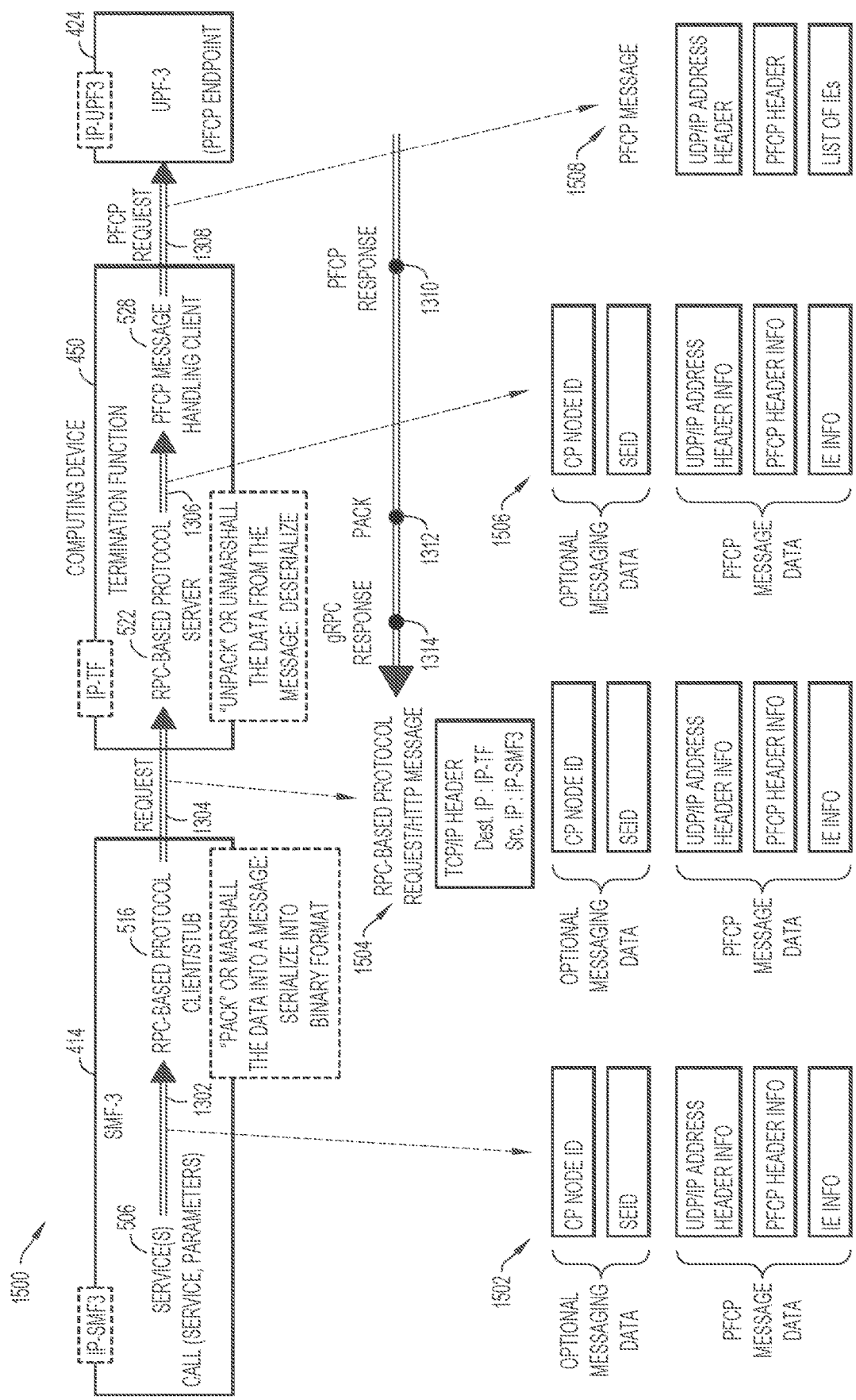
FIG. 15 is an illustrative representation of a node arrangement shown with the messaging of the call flow of FIG. 13, and with example messaging detail according to some implementations.

FIG. 15 is an illustrative representation of a node arrangement 1500 shown further with the messaging of the call flow of FIGS. 13 and 14, and with example messaging detail according to some implementations. In FIG. 15, the messaging associated with the call flow of FIGS. 13 and 14 are illustrated with steps 1302, 1304, 1306, 1308, 1310, 1312, and 1314. Several steps in FIG. 15 are shown with corresponding (example) message data. For step 1302, message data 1502 may include PFCP message data and optional messaging data (e.g. CP Node ID and SEID). The PFCP message data may include PFCP header information and IE information, as well as UDP/IP address header information that may be used for addressing UPF instance 424. For step 1304, message data 1504 may include a TCP/IP header of a RPC-based protocol message, as well as the optional messaging data (e.g. CP Node ID and SEID) and the PFCP message data (e.g. the UDP/IP address header information, the PFCP header information, and the IE information), which are serialized in the binary format. For step 1306, message data 1506 again may include the optional messaging data (e.g. CP Node ID and SEID) and the PFCP message data (e.g. the UDP/IP address header information, the PFCP header information, and the IE information). For step 1308, message data 1508 may be a PFCP message (i.e. per 3GPP standards) which includes a PFCP header (from the PFCP header information) and a list of IEs (from the IE information), which is addressed using a UDP/IP address header (from the UPD/IP address header information). Regarding the response messages in FIG. 15, step 1310 may involve message data that corresponds similarly to message data 1508 of step 1308; step 1312 may involve message data that corresponds similarly to message data 1506 of step 1306; and step 1314 may involve message data that corresponds similarly to message data 1504 of step 1304.

Figure 16:
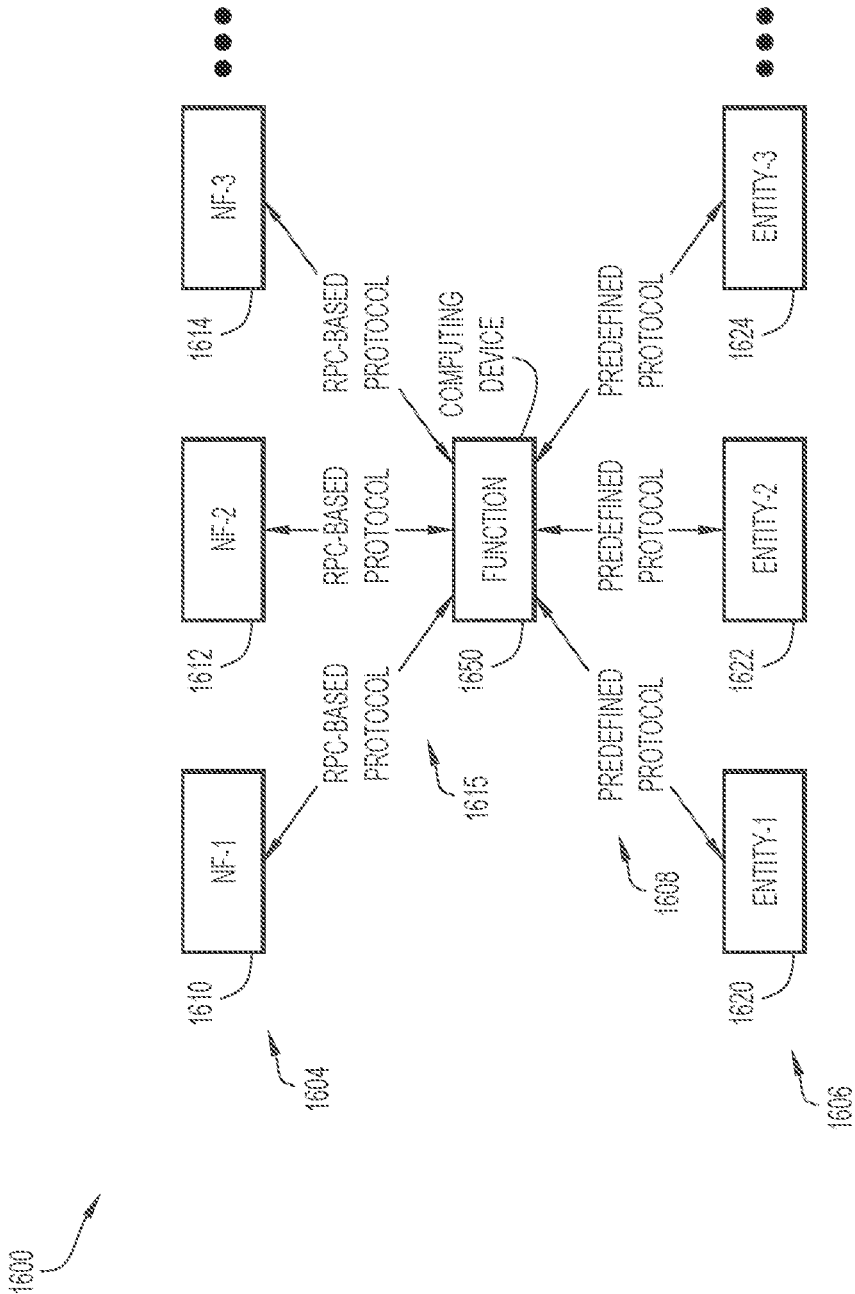
FIG. 16 is an illustrative representation of a more general interfacing arrangement between a plurality of Network Function (NF) instances and a plurality of entities of a network, with use of a function which provides a message service using a RPC-based protocol.

FIG. 16 is an illustrative representation of a more general interfacing arrangement 1600 between a plurality of NF instances 1604 and a plurality of entities 1606 with use of a function 1650 according to some implementations of the present disclosure. In the example scenario, the plurality of NF instances 1604 includes NF instances 1610, 1612, and 1614 (or NF-1, NF-2, and NF-3), and the plurality of entities 1606 includes entities 1620, 1622, and 1624 (or Entity-1, Entity-2, and Entity-3). The plurality of entities 1606 may be include any suitable entities (e.g. other NFs, computing devices, databases, etc.) that are accessible in a network. Function 1650 may be any suitable function, for example, a termination function, a proxy function, an interworking function, a communication function, etc. In some implementations, interfacing arrangement 1600 may be configured in the same or similar manner as the interfacing arrangements described in relation to the previously-described figures.

For communication with the plurality of NF instances 1604, function 1650 may provide a message service using an RPC-based protocol as described herein (or alternatively any other suitable predefined protocol). Here, a plurality of RPC-based protocol connections 1615 may be provided between NF instances 1604 and function 1650. In some implementations, each one of NF instances 1604 may utilize (e.g. only) a single RPC-based protocol connection with function 1650. On the other hand, for communication with the plurality of entities 1606, function 1650 may communicate according to a different predefined protocol (e.g. a mobile networking protocol, e.g. PFCP). Function 1650 may include a message handling client for maintaining a connection with each one of entities 1606, communicating in accordance with the predefined protocol. Here, a plurality of connections 1608 that employ the predefined protocol may exist between function 1650 and entities 1606. In some implementations, function 1650 may utilize (e.g. only) a single connection with each one of the entities 1606.

Techniques and mechanisms for providing a PFCP message service using a (e.g. "high-performance") RPC-based protocol have been described. The PFCP message service using the RPC-based protocol may be suitable to facilitate PFCP connection sharing by SMF instances of an SMF Set for minimizing connections between the SMFs and UPFs.

In one illustrative example of the present disclosure, a method of providing a PFCP message service with use of a RPC-based protocol is described. The method may be performed at a computing device having a server configured with the RPC-based protocol for the PFCP message service. The method may include receiving an RPC-based protocol message from an RPC-based protocol client stub at an SMF instance; unpacking the RPC-based protocol message for obtaining PFCP message data; and sending a PFCP message having the PFCP message data to a UPF instance. In some implementations, the RPC-based protocol utilizes an underlying transport protocol comprising HTTP 2.0 or greater. In some implementations, the RPC-based protocol is or includes gRPC or a gRPC protocol. In some implementations, the RPC-based protocol is or includes QUIC or a QUIC protocol.

In some implementations of the method, the computing device having the server configured with the RPC-based protocol for the PFCP message service may be configured to perform the method to serve a plurality of SMF instances of an SMF Set. Here, in some implementations, the method includes again performing the receiving, the unpacking, and the sending for each subsequent message of a plurality of a subsequent RPC-based protocol messages received from each RPC-based protocol client stub of a plurality of RPC-based protocol client stubs respectively situated at the plurality of SMF instances of the SMF Set. In some implementations, the sending of the PFCP message having the PFCP message data to the UPF instance further includes sending the PFCP message to an indicated one of a plurality of UPF instances with which PFCP sessions of the plurality of SMF instances of the SMF Set are maintained.

In some implementations of the method, the RPC-based protocol message may indicate a request, the PFCP message may indicate a PFCP request, and the PFCP message data may include PFCP message request data. Here, the method may further include receiving from the UPF instance a PFCP message which indicates a PFCP response having PFCP message response data; packing the PFCP message response data into an RPC-based protocol message which indicates a response; and sending the RPC-based protocol message which indicates the response to the RPC-based protocol client stub of the SMF instance.

In another illustrative example of the present disclosure, a computing device may be configured to operate a shared termination function for a plurality of SMF instances of an SMF Set and interface with one or more UPF instances. The computing device may include one or more processors, one or more memory elements coupled to the one or more processors, and instructions stored in the one or more memory elements. The instructions may be executable on the one or more processors for operation as a server configured with a RPC-based protocol for a PFCP message service, for serving a plurality of RPC-based protocol client stubs respectively situated at the plurality of SMF instances of the SMF Set, and for performing processing associated with each RPC-based protocol client stub of a respective SMF instance. The processing may involve receiving an RPC-based protocol message which indicates a request; unpacking the RPC-based protocol message which indicates the request for obtaining PFCP message request data; and operating or interfacing with a PFCP message handling client for sending a PFCP message having the PFCP message request data to an indicated one of the one or more UPF instances. The processing may further involve operating or interfacing with the PFCP message handling client for receiving a PFCP message which indicates a PFCP response from the indicated one of the one or more UPF instances, the PFCP message which indicates the PFCP response including PFCP message response data; packing the PFCP message response data into an RPC-based protocol message which indicates a response; and sending the RPC-based protocol message which indicates the response to the respective SMF instance.

In some implementations of the computing device, the RPC-based protocol utilizes an underlying transport protocol comprising HTTP 2.0 or greater. In some further implementations, the RPC-based protocol message may carry multiple requests or multiple responses with use of a binary framing of the underlying transport protocol comprising HTTP 2.0 or greater. In some implementations, the RPC-based protocol is or includes gRPC or a gRPC protocol. In some implementations, the RPC-based protocol is or includes QUIC or a QUIC protocol.

In some implementations of the computing device, the RPC-based protocol message which indicates the request and includes the PFCP message request data may be serialized PFCP message request data in binary format, and the unpacking of the RPC-based protocol message which indicates the request may include deserializing the serialized PFCP message request data. In addition, the RPC-based protocol message which indicates the response and includes the PFCP message response data may be deserialized PFCP message response data, and the packing of the RPC-based protocol message which indicates the response may include serializing the deserialized PFCP message response data into the binary format.

In some implementations of the computing device, the PFCP message request data of the RPC-based protocol message may be at least PFCP header information and IE information, and may further include UDP/IP address header information. In some implementations, the receiving of the PFCP message which indicates the PFCP response may include a SEID which identifies a PFCP session at the respective SMF instance, where the processing further involves maintaining a mapping between a node ID of the respective SMF instance and the SEID which identifies the PFCP session at the respective SMF instance; and identifying, based on the mapping, an address for sending the RPC-based protocol message which indicates the response to the respective SMF instance.

In yet another illustrative example of the present disclosure, a computer program product may include a non-transitory computer readable medium and instructions stored in the non-transitory computer readable medium, where the instructions are executable by one or more processors of a computing device to perform the above-described techniques.

Figure 17:
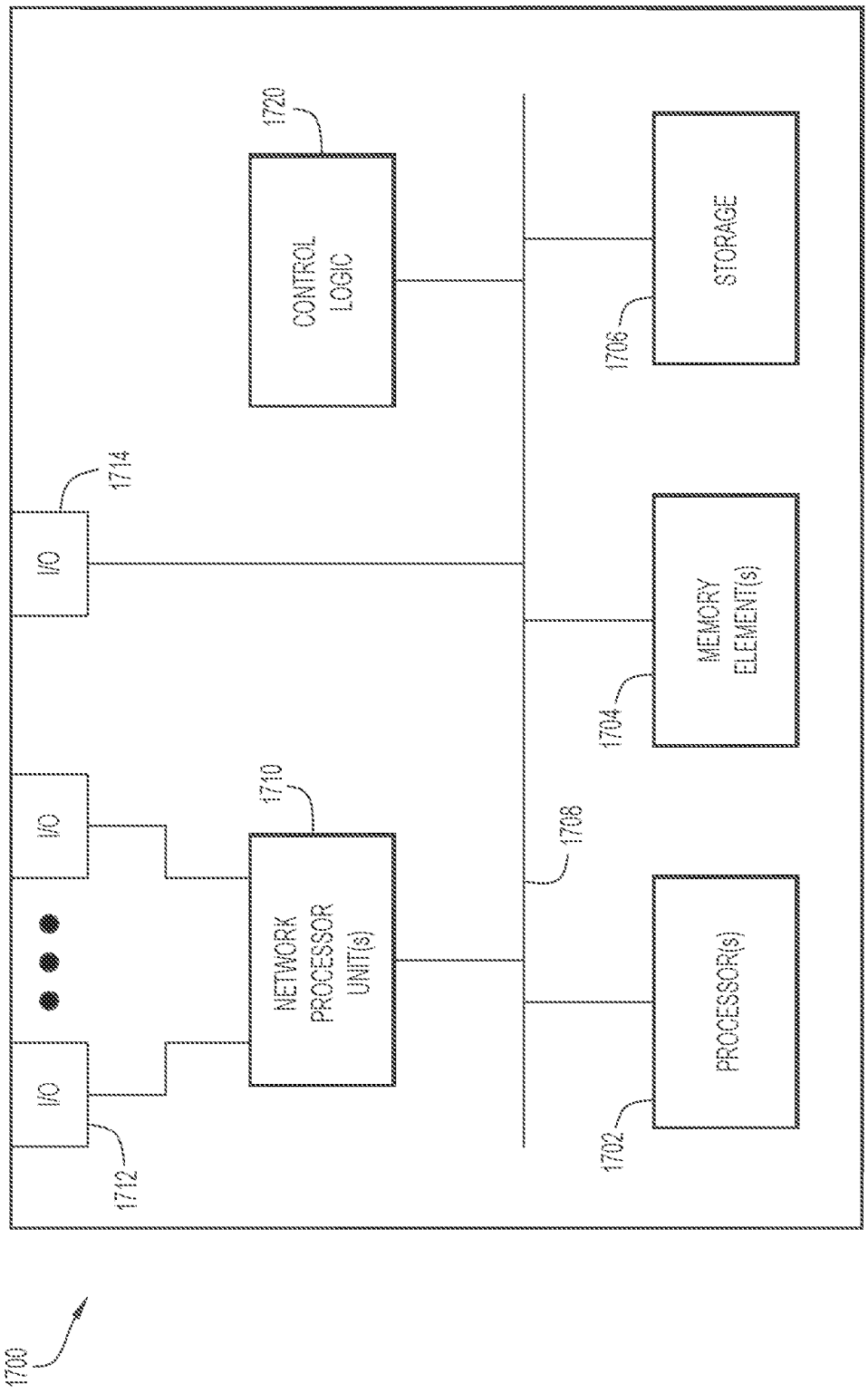
FIG. 17 illustrates a hardware block diagram of a computing device that may perform functions associated with operations discussed herein.

FIG. 17 illustrates a hardware block diagram of a computing device 1700 that may perform functions associated with operations discussed herein in connection with the techniques described in relation to the above figures, especially in relation to FIGS. 5-16. In various embodiments, a computing device, such as computing device 1700 or any combination of computing devices 1700, may be configured as any entity/entities as discussed for the techniques depicted in connection with the figures in order to perform operations of the various techniques discussed herein.

In at least one embodiment, the computing device 1700 may include one or more processor(s) 1702, one or more memory element(s) 1704, storage 1706, a bus 1708, one or more network processor unit(s) 1710 interconnected with one or more network input/output (I/O) interface(s) 1712, one or more I/O interface(s) 1714, and control logic 1720. In various embodiments, instructions associated with logic for computing device 1700 can overlap in any manner and are not limited to the specific allocation of instructions and/or operations described herein.

In at least one embodiment, processor(s) 1702 is/are at least one hardware processor configured to execute various tasks, operations and/or functions for computing device 1700 as described herein according to software and/or instructions configured for computing device 1700. Processor(s) 1702 (e.g., a hardware processor) can execute any type of instructions associated with data to achieve the operations detailed herein. In one example, processor(s) 1702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1704 and/or storage 1706 is/are configured to store data, information, software, and/or instructions associated with computing device 1700, and/or logic configured for memory element(s) 1704 and/or storage 1706. For example, any logic described herein (e.g., control logic 1720) can, in various embodiments, be stored for computing device 1700 using any combination of memory element(s) 1704 and/or storage 1706. Note that in some embodiments, storage 1706 can be consolidated with memory element(s) 1704 (or vice versa), or can overlap/exist in any other suitable manner.

In at least one embodiment, bus 1708 can be configured as an interface that enables one or more elements of computing device 1700 to communicate in order to exchange information and/or data. Bus 1708 can be implemented with any architecture designed for passing control, data and/or information between processors, memory elements/storage, peripheral devices, and/or any other hardware and/or software components that may be configured for computing device 1700. In at least one embodiment, bus 1708 may be implemented as a fast kernel-hosted interconnect, potentially using shared memory between processes (e.g., logic), which can enable efficient communication paths between the processes.

In various embodiments, network processor unit(s) 1710 may enable communication between computing device 1700 and other systems, entities, etc., via network I/O interface(s) 1712 to facilitate operations discussed for various embodiments described herein. In various embodiments, network processor unit(s) 1710 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 1700 and other systems, entities, etc. to facilitate operations for various embodiments described herein. In various embodiments, network I/O interface(s) 1712 can be configured as one or more Ethernet port(s), Fibre Channel ports, and/or any other I/O port(s) now known or hereafter developed. Thus, the network processor unit(s) 1710 and/or network I/O interface(s) 1712 may include suitable interfaces for receiving, transmitting, and/or otherwise communicating data and/or information in a network environment.

I/O interface(s) 1714 allow for input and output of data and/or information with other entities that may be connected to computer device 1700. For example, I/O interface(s) 1714 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1720 can include instructions that, when executed, cause processor(s) 1702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1704 and/or storage 1706 can store data, software, code, instructions (e.g., processor instructions), logic, parameters, combinations thereof, and/or the like used for operations described herein. This includes memory element(s) 1704 and/or storage 1706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

The invention claimed is:

1. A method comprising:
   at a computing device having a server configured with a remote procedure call (RPC)-based protocol for a Packet Forwarding Control Protocol (PFCP) message service,
      receiving an RPC-based protocol message from an RPC-based protocol client stub at an Session Management Function (SMF) instance;
      unpacking the RPC-based protocol message for obtaining PFCP message data; and
      sending a PFCP message having the PFCP message data to a User Plane Function (UPF) instance.

2. The method of claim 1, wherein the computing device having the server configured with the RPC-based protocol for the PFCP message service is configured to perform the method to serve a plurality of SMF instances of an SMF Set.

3. The method of claim 2, wherein sending the PFCP message having the PFCP message data to the UPF instance further comprises sending the PFCP message to an indicated one of a plurality of UPF instances with which PFCP sessions of the plurality of SMF instances of the SMF Set are maintained.

4. The method of claim 1, wherein the RPC-based protocol message indicates a request, the PFCP message indicates a PFCP request, and the PFCP message data comprises PFCP message request data, the method further comprising:
   at the computing device having the server configured with the RPC-based protocol for the PFCP message service,
      receiving from the UPF instance a PFCP message which indicates a PFCP response having PFCP message response data;
      packing the PFCP message response data into an RPC-based protocol message which indicates a response; and
      sending the RPC-based protocol message which indicates the response to the RPC-based protocol client stub of the SMF instance.

5. The method of claim 1, further comprising:
   at the computing device having the server configured with the RPC-based protocol for the PFCP message service,
      again performing the receiving, the unpacking, and the sending for each subsequent message of a plurality of a subsequent RPC-based protocol messages received from each RPC-based protocol client stub of a plurality of RPC-based protocol client stubs respectively situated at a plurality of SMF instances of an SMF Set.

6. The method of claim 1, wherein the RPC-based protocol utilizes an underlying transport protocol comprising Hypertext Transfer Protocol (HTTP) 2.0 or greater.

7. The method of claim 1, wherein the RPC-based protocol comprises a gRPC Remote Procedure Call (gRPC) protocol.

8. The method of claim 1, wherein the RPC-based protocol comprises a Quick User Datagram Protocol (UDP) Internet Connections (QUIC) protocol.

9. A computing device configured to operate a shared termination function for a plurality of Session Management Function (SMF) instances of an SMF Set and interface with one or more User Plane Function (UPF) instances, the computing device comprising:
   one or more processors;
   one or more memory elements coupled to the one or more processors;
   instructions stored in the one or more memory elements;
   the instructions being executable on the one or more processors for operation as a server configured with a Remote Procedure Call (RPC)-based protocol for a Packet Forwarding Control Protocol (PFCP) message service, for serving a plurality of RPC-based protocol client stubs respectively situated at the plurality of SMF instances of the SMF Set, and for performing processing associated with each RPC-based protocol client stub of a respective SMF instance by:
      receiving an RPC-based protocol message which indicates a request;
      unpacking the RPC-based protocol message which indicates the request for obtaining PFCP message request data; and
      operating or interfacing with a PFCP message handling client for sending a PFCP message having the PFCP message request data to an indicated one of the one or more UPF instances.

10. The computing device of claim 9, wherein:
    the instructions are executable on the one or more processors for operation as the server configured with the RPC-based protocol for the PFCP message service for further performing processing associated with each RPC-based protocol client stub of the respective SMF instance by:
       operating or interfacing with the PFCP message handling client for receiving a PFCP message which indicates a PFCP response from the indicated one of the one or more UPF instances, the PFCP message which indicates the PFCP response including PFCP message response data;
       packing the PFCP message response data into an RPC-based protocol message which indicates a response; and
       sending the RPC-based protocol message which indicates the response to the respective SMF instance.

11. The computing device of claim 10, wherein:
    the RPC-based protocol message which indicates the request and includes the PFCP message request data comprises serialized PFCP message request data in binary format, and the unpacking of the RPC-based protocol message which indicates the request further comprises deserializing the serialized PFCP message request data, and
    the RPC-based protocol message which indicates the response and includes the PFCP message response data comprises deserialized PFCP message response data, and the packing of the RPC-based protocol message which indicates the response further comprises serializing the deserialized PFCP message response data into the binary format.

12. The computing device of claim 10, wherein receiving the PFCP message which indicates the PFCP response includes a session endpoint identifier (SEID) which identifies a PFCP session at the respective SMF instance, and wherein:
    the instructions are executable on the one or more processors for operation as the server configured with the RPC-based protocol for the PFCP message service for further performing processing associated with each RPC-based protocol client stub of the respective SMF instance by:
       maintaining a mapping between a node ID of the respective SMF instance and the SEID which identifies the PFCP session at the respective SMF instance;

identifying, based on the mapping, an address for sending the RPC-based protocol message which indicates the response to the respective SMF instance.

13. The computing device of claim 10, wherein the PFCP message request data of the RPC-based protocol message comprises at least PFCP header information and Information Element (IE) information.

14. The computing device of claim 10, wherein the RPC-based protocol utilizes an underlying transport protocol comprising Hypertext Transfer Protocol (HTTP) 2.0 or greater.

15. The computing device of claim 14, wherein the RPC-based protocol message carries multiple requests or multiple responses with use of a binary framing of the underlying transport protocol comprising HTTP 2.0 or greater.

16. The computing device of claim 10, wherein the RPC-based protocol comprises a gRPC Remote Procedure Call (gRPC) protocol.

17. A computer program product comprising:
a non-transitory computer readable medium;
instructions stored in the non-transitory computer readable medium;
the instructions being executable by one or more processors of a computing device to serve as a shared termination function for a plurality of Session Management Function (SMF) instances of an SMF Set and interface with one or more User Plane Function (UPF) instances;
the instructions being executable on the one or more processors for operation as a server configured with a Remote Procedure Call (RPC)-based protocol for a Packet Forwarding Control Protocol (PFCP) message service, for serving a plurality of RPC-based protocol client stubs respectively situated at the plurality of SMF instances of the SMF Set and performing processing associated with each RPC-based protocol client stub of a respective SMF instance by:
receiving an RPC-based protocol message which indicates a request;
unpacking the RPC-based protocol message which indicates the request for obtaining PFCP message request data; and
operating or interfacing with a PFCP message handling client for sending a PFCP message having the PFCP message request data to an indicated one of the one or more UPF instances.

18. The computer program product of claim 17, wherein:
the instructions are executable on the one or more processors for operation as the server configured with the RPC-based protocol for further performing processing associated with each RPC-based protocol client stub of the respective SMF instance by:
operating or interfacing with the PFCP message handling client for receiving a PFCP message which indicates a PFCP response from the indicated one of the one or more UPF instances, the PFCP message which indicates the PFCP response including PFCP message response data;
packing the PFCP message response data into an RPC-based protocol message which indicates a response; and
sending the RPC-based protocol message which indicates the response to the respective SMF instance.

19. The computer program product of claim 17, wherein the RPC-based protocol utilizes an underlying transport protocol comprising Hypertext Transfer Protocol (HTTP) 2.0 or greater.

20. The computer program product of claim 17, wherein the RPC-based protocol comprises a gRPC Remote Procedure Call (gRPC) protocol.

* * * * *